(12) United States Patent
Kanoh et al.

(10) Patent No.: US 11,166,020 B2
(45) Date of Patent: Nov. 2, 2021

(54) ENCODER THAT DETERMINES AN INTERPOLATION METHOD FOR INTERPOLATING A PIXEL LOCATED OUTSIDE OF A REFERABLE REGION INCLUDING A BLOCK IN A RECONSTRUCTED IMAGE

(71) Applicant: Panasonic Intellectual Property Corporation of America, Torrance, CA (US)

(72) Inventors: Ryuichi Kanoh, Osaka (JP); Tadamasa Toma, Osaka (JP); Takahiro Nishi, Nara (JP); Kiyofumi Abe, Osaka (JP); Takashi Hashimoto, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/701,761

(22) Filed: Dec. 3, 2019

(65) Prior Publication Data
US 2020/0107020 A1    Apr. 2, 2020

Related U.S. Application Data

(63) Continuation of application No. PCT/JP2018/020658, filed on May 30, 2018.
(Continued)

(51) Int. Cl.
*H04N 19/117* (2014.01)
*H04N 19/14* (2014.01)
(Continued)

(52) U.S. Cl.
CPC .......... *H04N 19/117* (2014.11); *H04N 19/14* (2014.11); *H04N 19/176* (2014.11); *H04N 19/196* (2014.11)

(58) Field of Classification Search
CPC .................... H04N 19/117; H04N 19/176
See application file for complete search history.

(56) References Cited

U.S. PATENT DOCUMENTS

| 2007/0172153 A1* | 7/2007 | Song ............... H04N 19/61 382/300 |
| 2008/0089412 A1* | 4/2008 | Ugur ............... H04N 19/517 375/240.12 |

(Continued)

FOREIGN PATENT DOCUMENTS

| JP | 2007-259149 | 10/2007 |
| JP | 2014-533008 | 12/2014 |

(Continued)

OTHER PUBLICATIONS

International Search Report (ISR) dated Jun. 26, 2018 in International (PCT) Application No. PCT/JP2018/020658.
(Continued)

*Primary Examiner* — Zhubing Ren
(74) *Attorney, Agent, or Firm* — Wenderoth, Lind & Ponack, L.L.P.

(57) ABSTRACT

An encoder includes processing circuitry and memory. Using the memory, the processing circuitry: encodes and reconstructs an image to generate a reconstructed image; determines, according to a characteristic of a block in the reconstructed image, an interpolation method for interpolating pixels located outside a referable region including the block; interpolates the pixels located outside the referable region, using the interpolation method determined; and applies a filter to the block using the pixels interpolated.

16 Claims, 33 Drawing Sheets

Related U.S. Application Data

(60) Provisional application No. 62/515,113, filed on Jun. 5, 2017.

(51) Int. Cl.
*H04N 19/176* (2014.01)
*H04N 19/196* (2014.01)

(56) References Cited

U.S. PATENT DOCUMENTS

| | | | |
|---|---|---|---|
| 2010/0098345 A1* | 4/2010 | Andersson | H04N 19/61 |
| | | | 382/238 |
| 2010/0226432 A1* | 9/2010 | Wittmann | H04N 19/523 |
| | | | 375/240.12 |
| 2013/0101016 A1 | 4/2013 | Chong et al. | |
| 2014/0112396 A1* | 4/2014 | Ikeda | H04N 19/117 |
| | | | 375/240.29 |
| 2016/0234492 A1* | 8/2016 | Li | H04N 19/70 |
| 2018/0241998 A1* | 8/2018 | Chen | H04N 19/51 |

FOREIGN PATENT DOCUMENTS

| | | |
|---|---|---|
| JP | 2015-136147 | 7/2015 |
| WO | 2013/058876 | 4/2013 |

OTHER PUBLICATIONS

H.265 (ISO/IEC 23008-2 HEVC (High Efficiency Video Coding)), Dec. 1, 2013.

\* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>WHERE $\omega_0 = \begin{cases} \sqrt{\dfrac{2}{N}} & i=0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$<br>WHERE $\omega_0 = \begin{cases} \sqrt{\dfrac{2}{N}} & i=0 \\ 1 & i \neq 0 \end{cases}$, $\omega_1 = \begin{cases} \sqrt{\dfrac{2}{N}} & j=0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

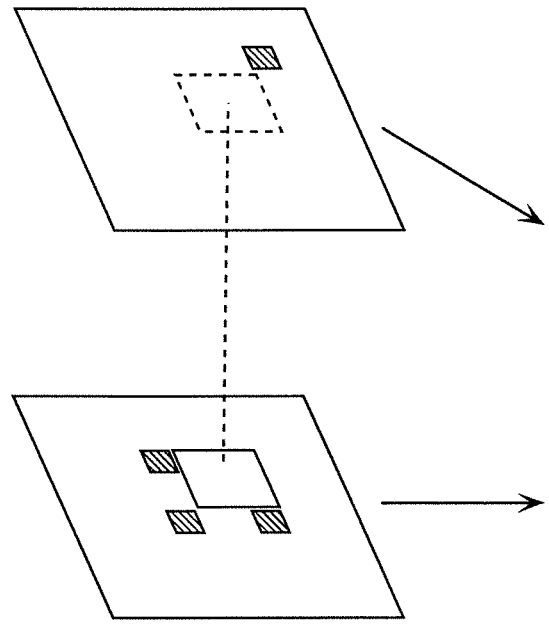

FIG. 16

ENCODER THAT DETERMINES AN INTERPOLATION METHOD FOR INTERPOLATING A PIXEL LOCATED OUTSIDE OF A REFERABLE REGION INCLUDING A BLOCK IN A RECONSTRUCTED IMAGE

CROSS REFERENCE TO RELATED APPLICATIONS

This application is a U.S. continuation application of PCT International Patent Application Number PCT/JP2018/020658 filed on May 30, 2018, claiming the benefit of priority of U.S. Provisional Patent Application No. 62/515,113 filed on Jun. 5, 2017, the entire contents of which are hereby incorporated by reference.

BACKGROUND

1. Technical Field

The present disclosure relates to an encoder, a decoder, an encoding method, and a decoding method.

2. Description of the Related Art

Conventionally, H.265 has been known as standards for encoding moving pictures. H.265 is also referred to as High-Efficiency Video Coding (HEVC) (H.265 (ISO/IEC 23008-2 HEVC (High Efficiency Video Coding)) (Non-patent Literature (NPL) 1)).

SUMMARY

In such encoding and decoding techniques, further improvement is desired.

In view of this, the present disclosure provides an encoder, for instance, capable of effectively performing processing for generating a prediction image.

An encoder according to one aspect of the present disclosure includes processing circuitry and memory. Using the memory, the processing circuitry: encodes and reconstructs an image to generate a reconstructed image; determines, according to a characteristic of a block in the reconstructed image, an interpolation method for interpolating a pixel located outside a referable region including the block; interpolates the pixel located outside the referable region using the interpolation method determined; and applies a filter to the block using the pixel interpolated.

A decoder according to one aspect of the present disclosure includes processing circuitry and memory. Using the memory, the processing circuitry: reconstructs an encoded image to generate a reconstructed image; determines, according to a characteristic of a block in the reconstructed image, an interpolation method for interpolating a pixel located outside a referable region including the block; interpolates the pixel located outside the referable region using the interpolation method determined; and applies a filter to the block using the pixel interpolated.

General or specific aspects of the present disclosure may be realized as a system, method, integrated circuit, computer program, computer-readable medium such as a CD-ROM, or any given combination thereof.

With the encoder according to one aspect of the present disclosure, for instance, it is possible to effectively perform processing for generating a prediction image.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

FIG. 9B is for illustrating an outline of a process for deriving a motion vector via merge mode;

FIG. 16 illustrates examples of an interpolation method in which a padding process is performed in the first interpolation process and a mirroring process is performed in the second interpolation process according to Embodiment 2;

DETAILED DESCRIPTION OF THE EMBODIMENTS

Figure 1:
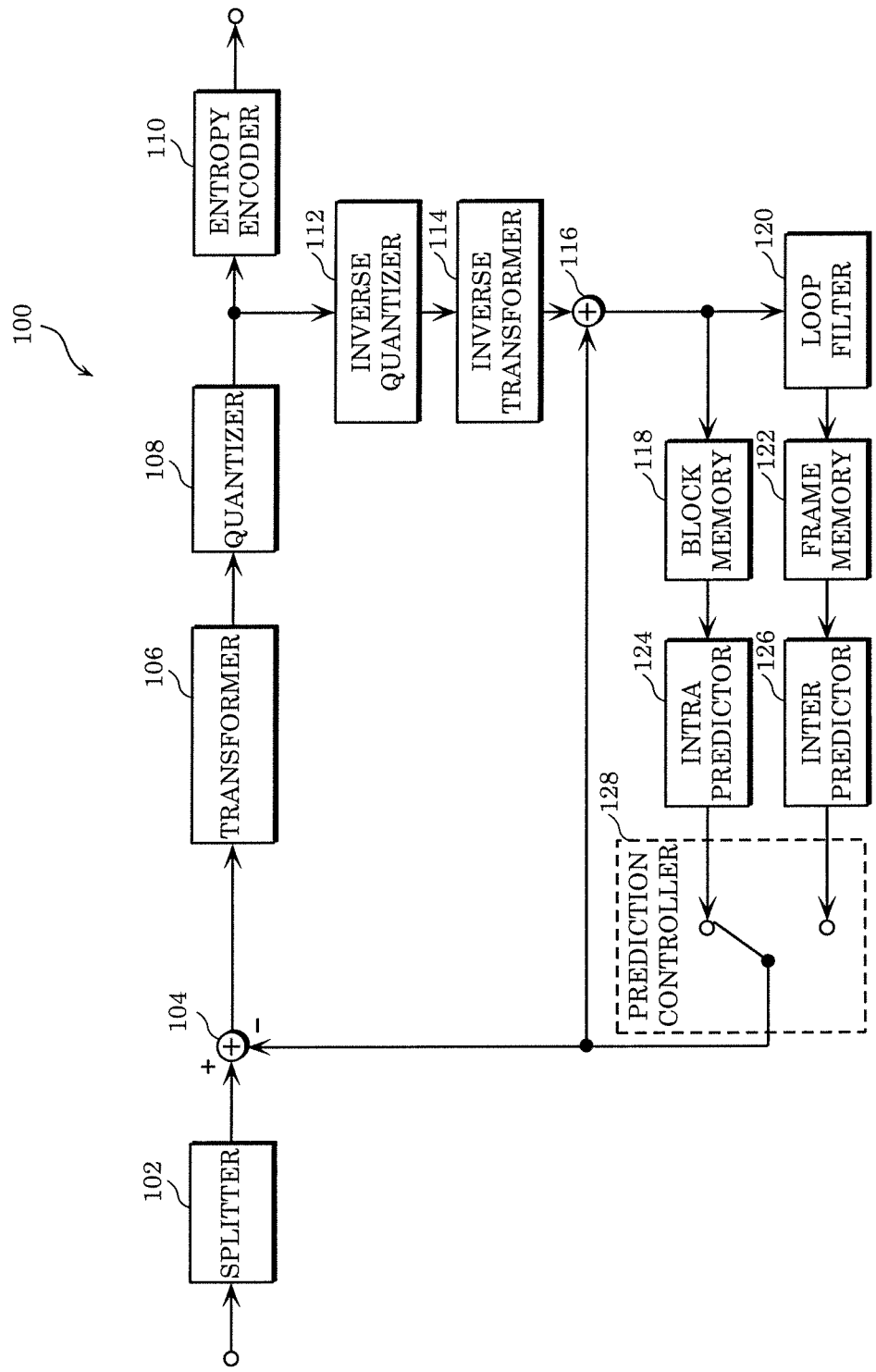
FIG. 1 is a block diagram illustrating a functional configuration of an encoder according to Embodiment 1.

An encoder according to one aspect of the present disclosure includes processing circuitry and memory. Using the memory, the processing circuitry: encodes and reconstructs an image to generate a reconstructed image; determines, according to a characteristic of a block in the reconstructed image, an interpolation method for interpolating a pixel located outside a referable region including the block; interpolates the pixel located outside the referable region using the interpolation method determined; and applies a filter to the block using the pixel interpolated. For example, in the determination of the interpolation method, the interpolation method may be determined by selecting an interpolation method from among a plurality of interpolation methods based on a parameter indicating the characteristic of the block. The parameter may be a class categorized by gradient directionality and gradient activity of an image in the block.

With this, when pixels located outside a referable region are necessary for filter application to a block, the pixels are interpolated using one or more pixels in the referable region, therefore, there is no need to store, in a memory, actual pixels located outside the referable region in a reconstructed image. Accordingly, memory capacity may be reduced. Moreover, since the pixels are interpolated using an interpolation method determined according to a characteristic of the block, it is possible to interpolate pixels having more appropriate pixel values compared to the case of interpolating pixels using a fixed interpolation method irrespective of a characteristic of a block. In other words, it is possible to approximate the pixel values of pixels obtained through interpolation to the pixel values of actual pixels located outside the referable region in the reconstructed image. As a result, filtering accuracy can be enhanced.

The parameter may indicate gradient directionality of an image in the block.

This makes it possible to extensively apply a characteristic, e.g., gradient or edge, of an image in a block even to an area outside a referable region.

The interpolation method determined may include: a first interpolation process of interpolating at least one pixel placed along the gradient directionality; and a second interpolation process of interpolating, after the first interpolation process, at least one pixel placed along a direction vertical to the gradient directionality.

This makes it possible to interpolate appropriate pixels in the vicinity of a referable region. In other words, it is possible to use, in the second interpolation process, a pixel located outside the referable region and interpolated through the first interpolation process. For example, in the second interpolation process, it is possible to copy a pixel located in a referable region and a pixel located outside the referable region and interpolated through the first interpolation process, to interpolate at least one pixel placed along a direction vertical to gradient directionality. This makes it possible to extensively apply a characteristic, e.g., gradient or edge, of an image in a block in an appropriate manner even to the vicinity of a referable region.

The interpolation method determined may include at least one of a padding process or a mirroring process. The padding process is a process of copying a copy source pixel that is located in the referable region and is adjacent to a boundary of the referable region, to interpolate at least one pixel that is placed outside the referable region and aligned with the copy source pixel along a predetermined direction and that has a pixel value equal to a pixel value of the copy source pixel. The mirroring process is a process of copying N copy source pixels placed along a predetermined direction in the referable region, to interpolate N pixels that are placed outside the referable region, aligned with the N copy source pixels along the predetermined direction, and symmetric to the N copy source pixels with respect to the boundary, each of the N pixels having a pixel value equal to a pixel value of a corresponding one of the N copy source pixels, where N is an integer greater than or equal to 1. The predetermined direction may be a direction according to the characteristic of the block. The predetermined direction is, for example, gradient direction of an image or a direction vertical to the gradient directionality.

This makes it possible to easily interpolate pixels having appropriate pixel values.

The processing circuitry may further determine, for each processing unit including the block, whether to interpolate the pixel located outside the referable region using the interpolation method determined. The processing unit may be a slice, a tile, a coding tree unit (CTU), or a frame.

With this, whether interpolation is to be performed is determined for each processing unit, and when it is determined that interpolation is to be performed, pixels located outside a referable region are interpolated using the determined interpolation method, and this can avoid the trouble of performing the interpolation even for a processing unit which does not need the interpolation. Accordingly, a processing load can be reduced.

The processing circuitry may interpolate the pixel located outside the referable region by deriving at least one of a luma value or a chroma value of the pixel.

This makes it possible to derive, through interpolation, appropriate luma values or chroma values for pixels located outside a referable region.

The filter to be applied to the block may be at least one of an adaptive loop filter (ALF) or a sample adaptive offset (SAO) filter.

This makes it possible to enhance ALF and SAO filtering accuracy.

A decoder according to one aspect of the present disclosure includes processing circuitry and memory. Using the memory, the processing circuitry: reconstructs an encoded image to generate a reconstructed image; determines, according to a characteristic of a block in the reconstructed image, an interpolation method for interpolating a pixel located outside a referable region including the block; interpolates the pixel located outside the referable region using the interpolation method determined; and applies a filter to the block using the pixel interpolated. For example, in the determination of the interpolation method, the interpolation method may be determined by selecting an interpolation method from among a plurality of interpolation methods based on a parameter indicating the characteristic of the block. The parameter may be a class categorized by gradient directionality and gradient activity of an image in the block.

With this, when pixels located outside a referable region are necessary for filter application to a block, the pixels are interpolated using one or more pixels in the referable region, therefore, there is no need to store, in a memory, actual pixels located outside the referable region in a reconstructed image. Accordingly, memory capacity may be reduced. Moreover, since the pixels are interpolated using an interpolation method determined according to a characteristic of the block, it is possible to interpolate pixels having more appropriate pixel values compared to the case of interpolating pixels using a fixed interpolation method irrespective of a characteristic of a block. In other words, it is possible to approximate the pixel values of pixels obtained through the interpolation to the pixel values of actual pixels located outside the referable region in the reconstructed image. As a result, filtering accuracy can be enhanced.

The parameter may indicate gradient directionality of an image in the block.

This makes it possible to extensively apply a characteristic, e.g., gradient or edge, of an image of a block even to the vicinity of a referable region.

The interpolation method determined may include: a first interpolation process of interpolating at least one pixel placed along the gradient directionality; and a second interpolation process of interpolating, after the first interpolation process, at least one pixel placed along a direction vertical to the gradient directionality.

This makes it possible to interpolate appropriate pixels in the vicinity of a referable region. In other words, it is possible to use, in the second interpolation process, a pixel located outside the referable region and interpolated through the first interpolation process. For example, in the second interpolation process, it is possible to copy a pixel located in a referable region and a pixel located outside the referable region and interpolated through the first interpolation process, to interpolate at least one pixel placed along a direction vertical to gradient directionality. This makes it possible to extensively apply a characteristic, e.g., gradient or edge, of an image of a block in an appropriate manner even to the vicinity of a referable region.

The interpolation method determined may include at least one of a padding process or a mirroring process. The padding process is a process of copying a copy source pixel that is located in the referable region and is adjacent to a boundary of the referable region, to interpolate at least one pixel that is placed outside the referable region and aligned with the copy source pixel along a predetermined direction and that has a pixel value equal to a pixel value of the copy source pixel. The mirroring process is a process of copying N copy source pixels placed along a predetermined direction in the referable region, to interpolate N pixels that are placed outside the referable region, aligned with the N copy source pixels along the predetermined direction, and symmetric to the N copy source pixels with respect to the boundary, each of the N pixels having a pixel value equal to a pixel value of a corresponding one of the N copy source pixels, where N is an integer greater than or equal to 1. The predetermined direction may be a direction according to the characteristic of the block.

This makes it possible to easily interpolate pixels having appropriate pixel values.

The processing circuitry may further determine, for each processing unit including the block, whether to interpolate the pixel located outside the referable region using the interpolation method determined. The processing unit may be a slice, a tile, a coding tree unit (CTU), or a frame.

With this, whether interpolation is to be performed is determined for each processing unit, and when it is determined that interpolation is to be performed, pixels located outside a referable region are interpolated using the determined interpolation method, and this can avoid performing the interpolation even for a processing unit which does not need the interpolation. Accordingly, a processing load can be reduced.

The processing circuitry may interpolate the pixel located outside the referable region by deriving at least one of a luma value or a chroma value of the pixel.

This makes it possible to derive, through interpolation, appropriate luma values or chroma values for pixels located outside a referable region.

The filter to be applied to the block may be at least one of an adaptive loop filter (ALF) or a sample adaptive offset (SAO) filter.

This makes it possible to enhance ALF and SAO filtering accuracy.

Hereinafter, embodiments will be described with reference to the drawings.

Note that the embodiments described below each show a general or specific example. The numerical values, shapes, materials, components, the arrangement and connection of the components, steps, order of the steps, etc. that are indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a process corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
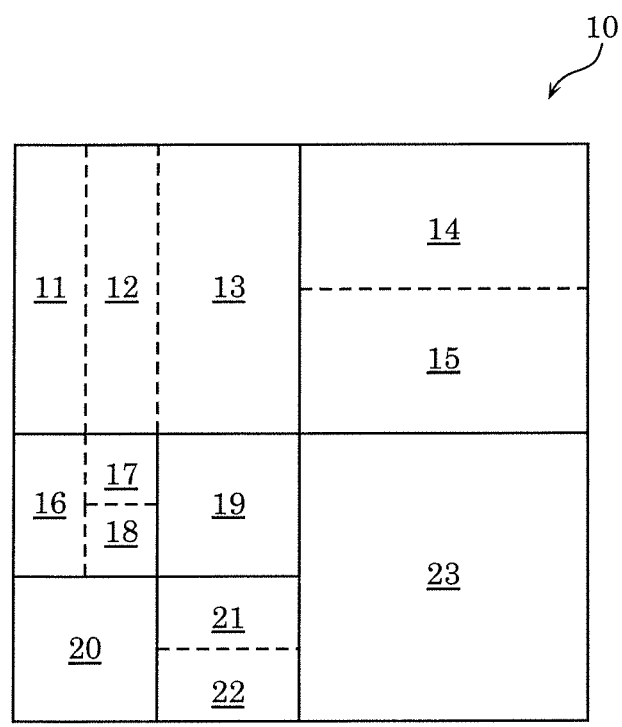
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO) filter, and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
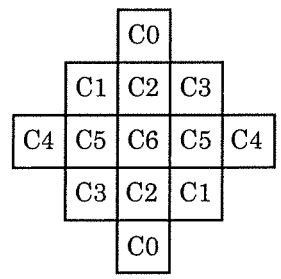
FIG. 4A illustrates one example of a filter shape used in ALF.
Figure 4B:
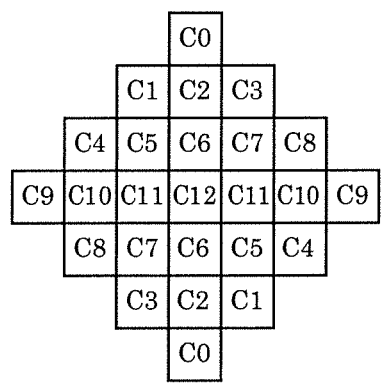
FIG. 4B illustrates another example of a filter shape used in ALF.
Figure 4C:
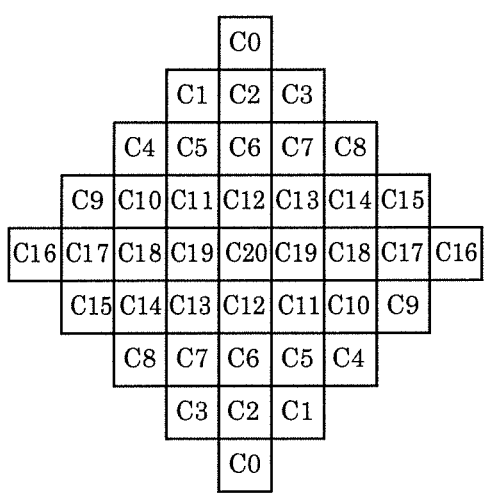
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPL 1).

Figure 5A:
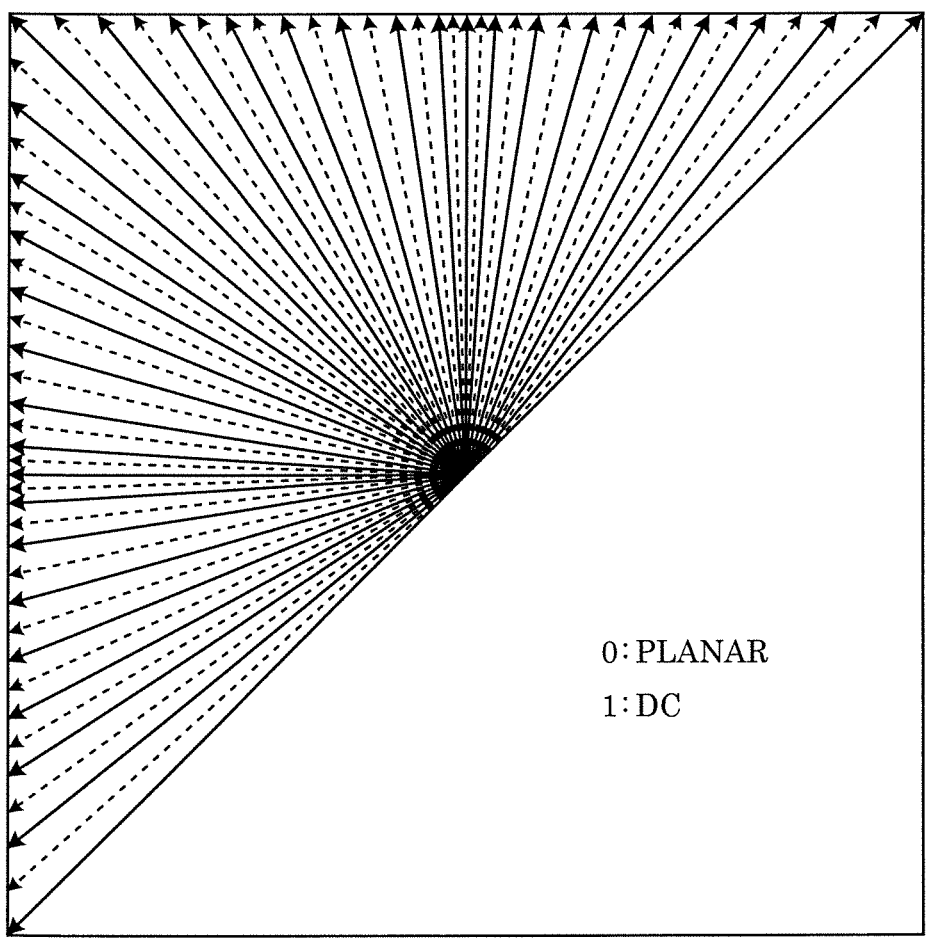
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
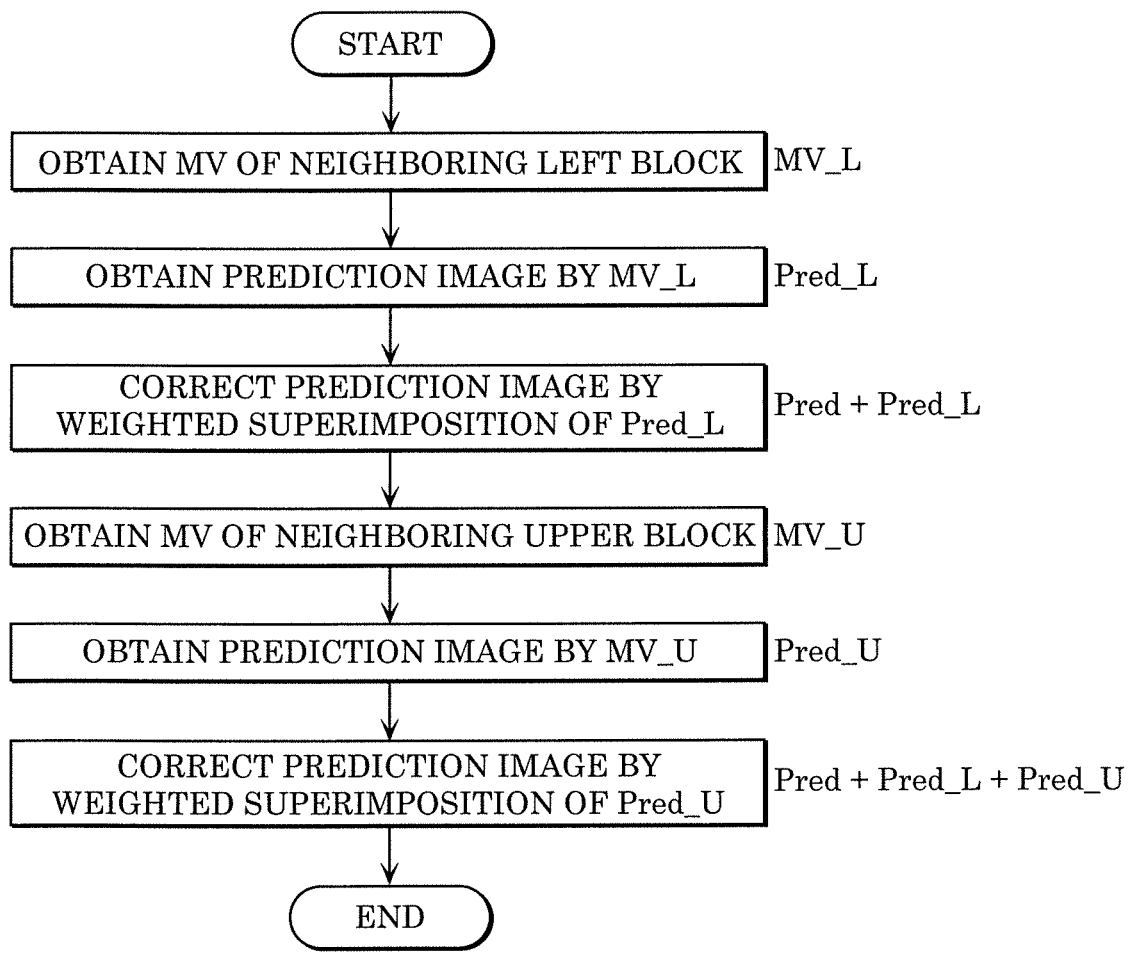
FIG. 5B is a flow chart for illustrating an outline of a prediction image correction process performed via OBMC processing.
Figure 5C:
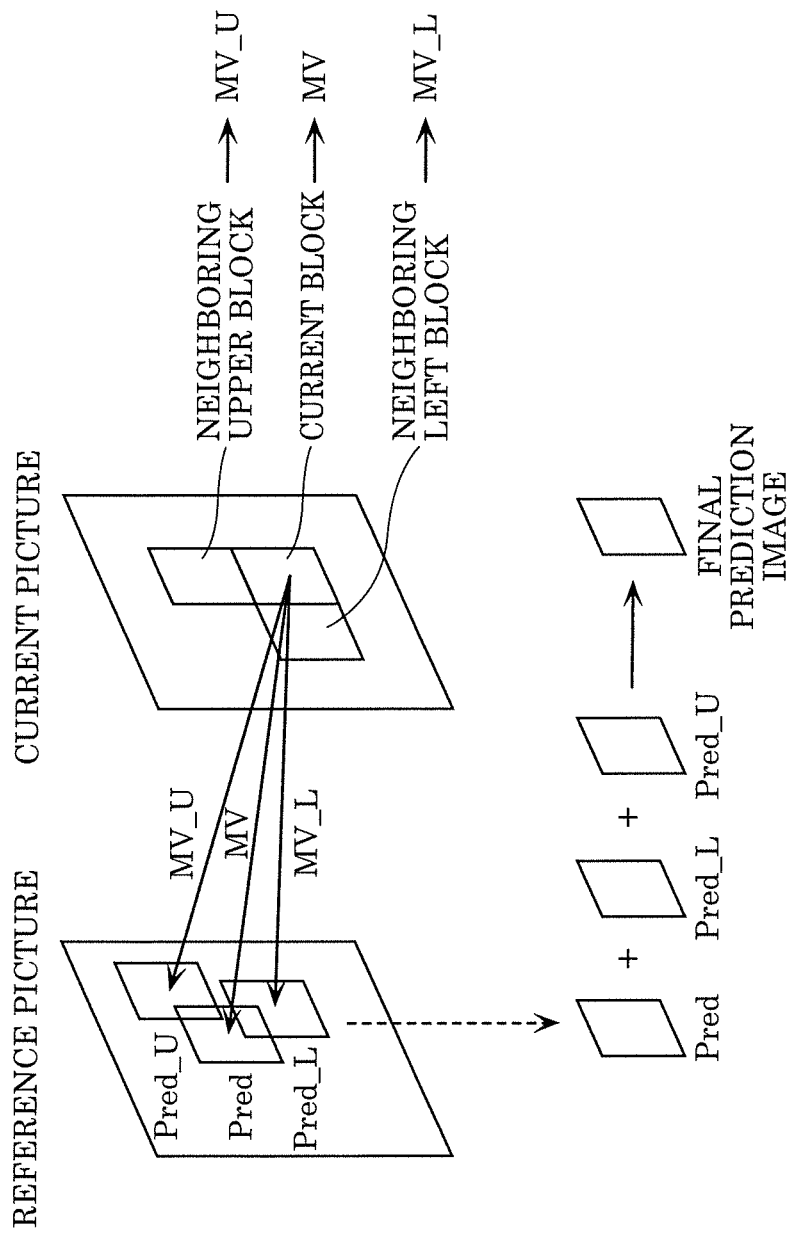
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
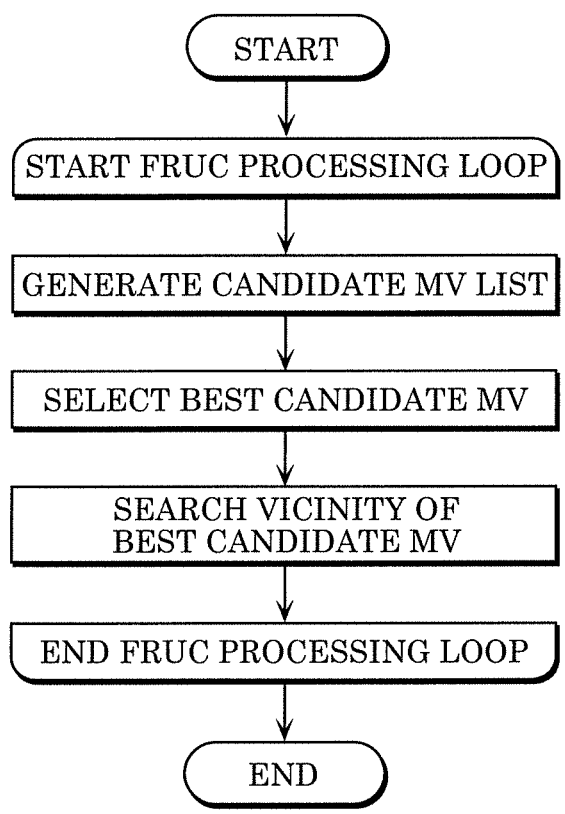
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block.

Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
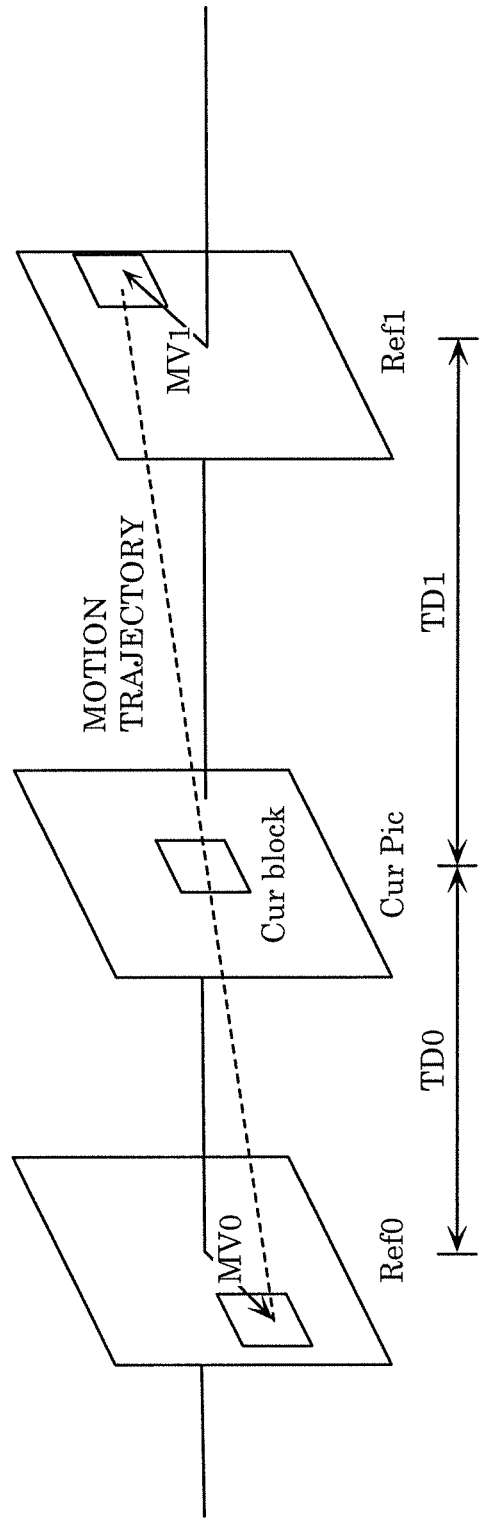
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
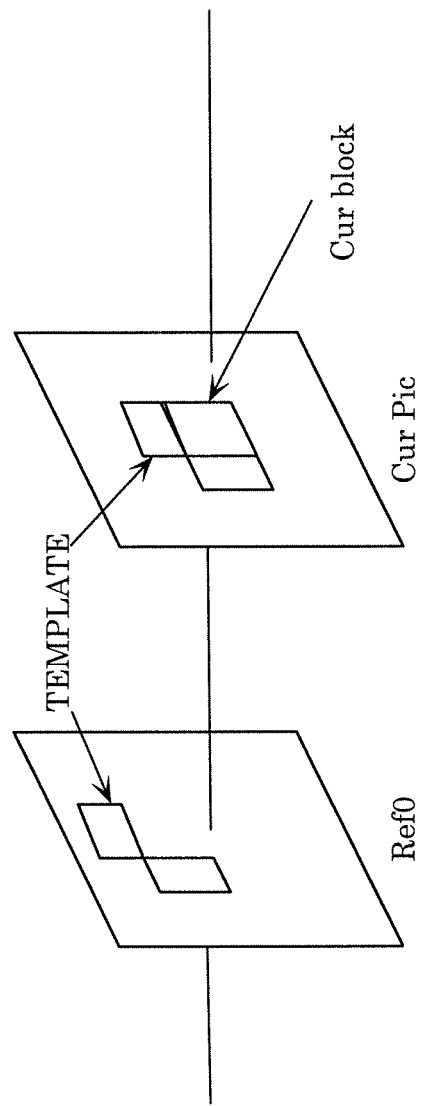
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper regions and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
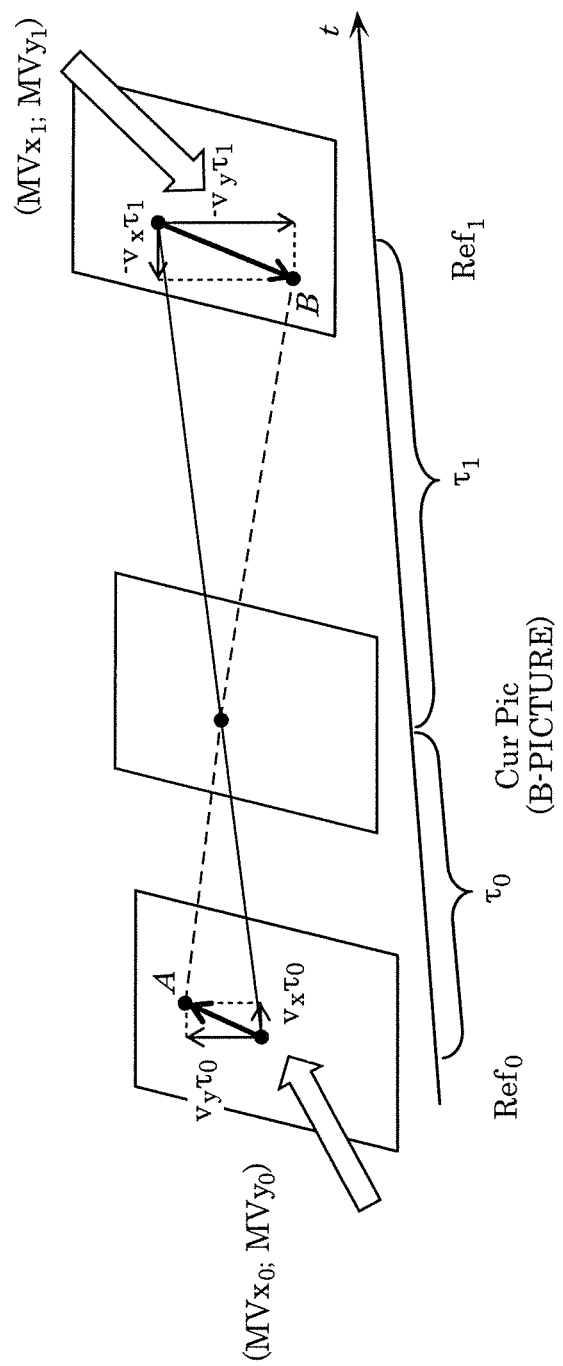
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
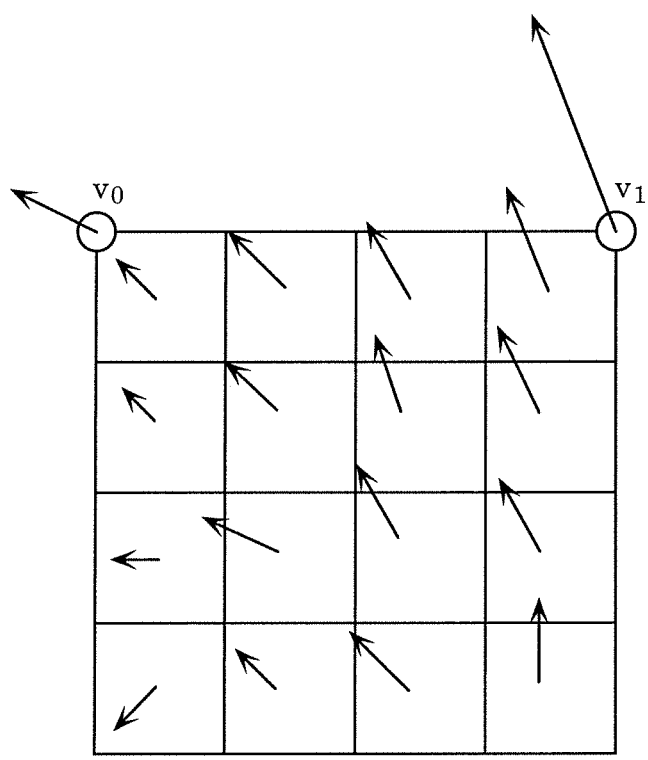
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0x} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
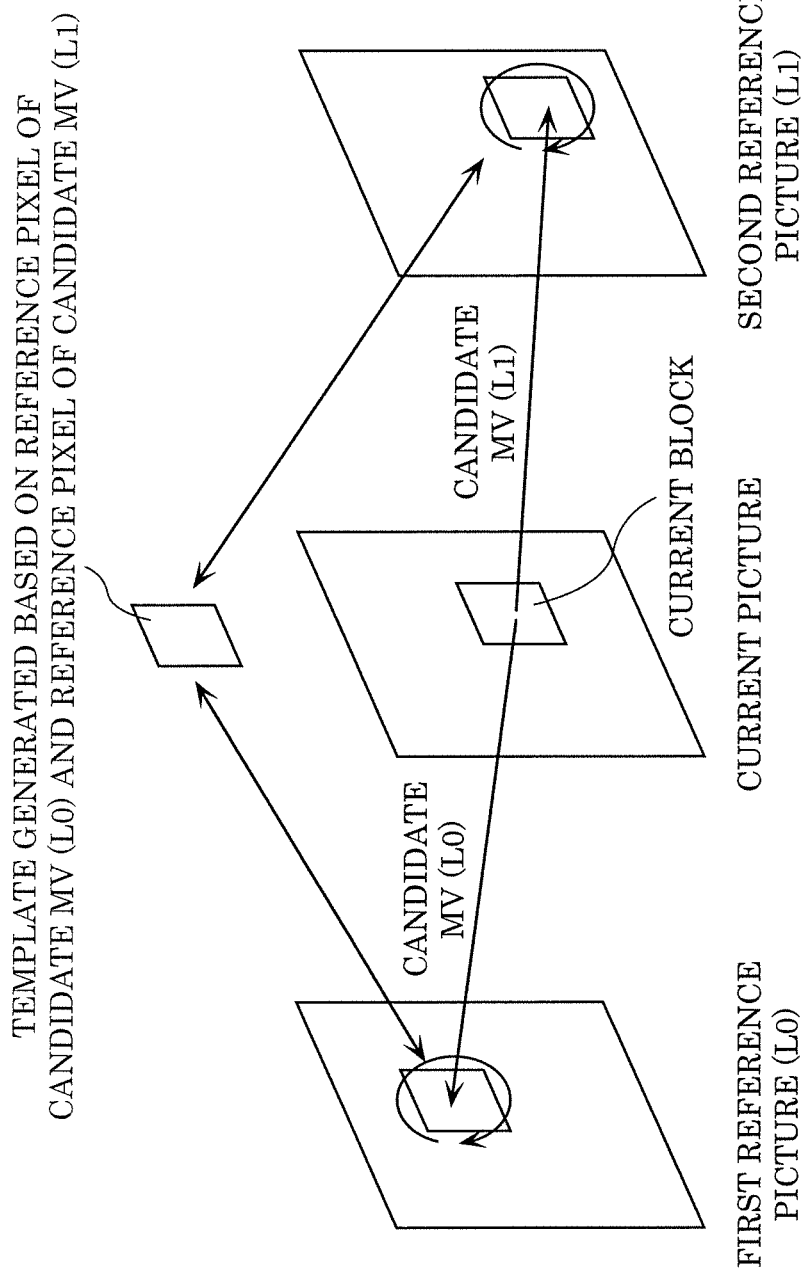
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV Here, an example of a mode that generates a prediction image by using LIC processing will be given.

Figure 9D:
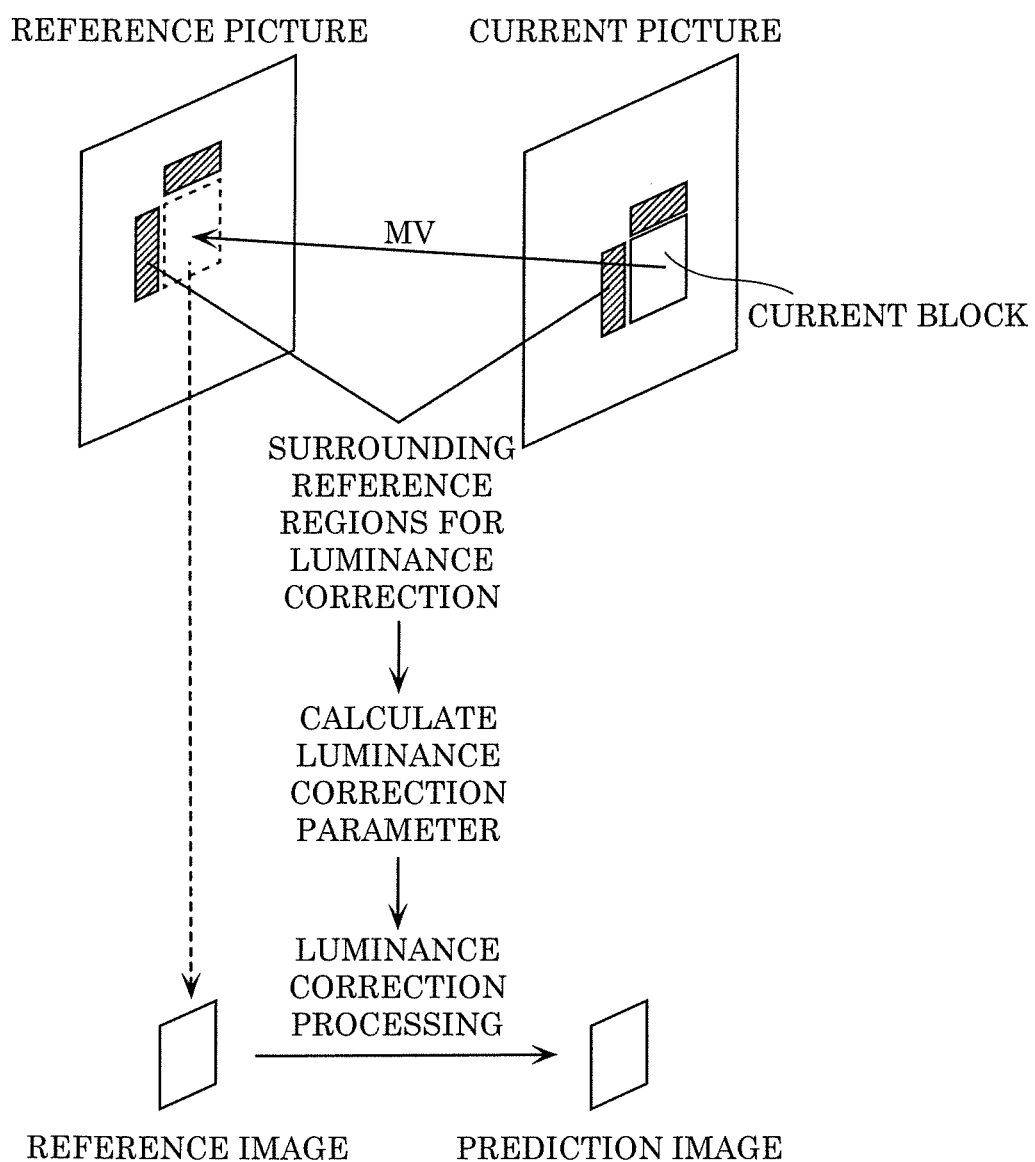
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
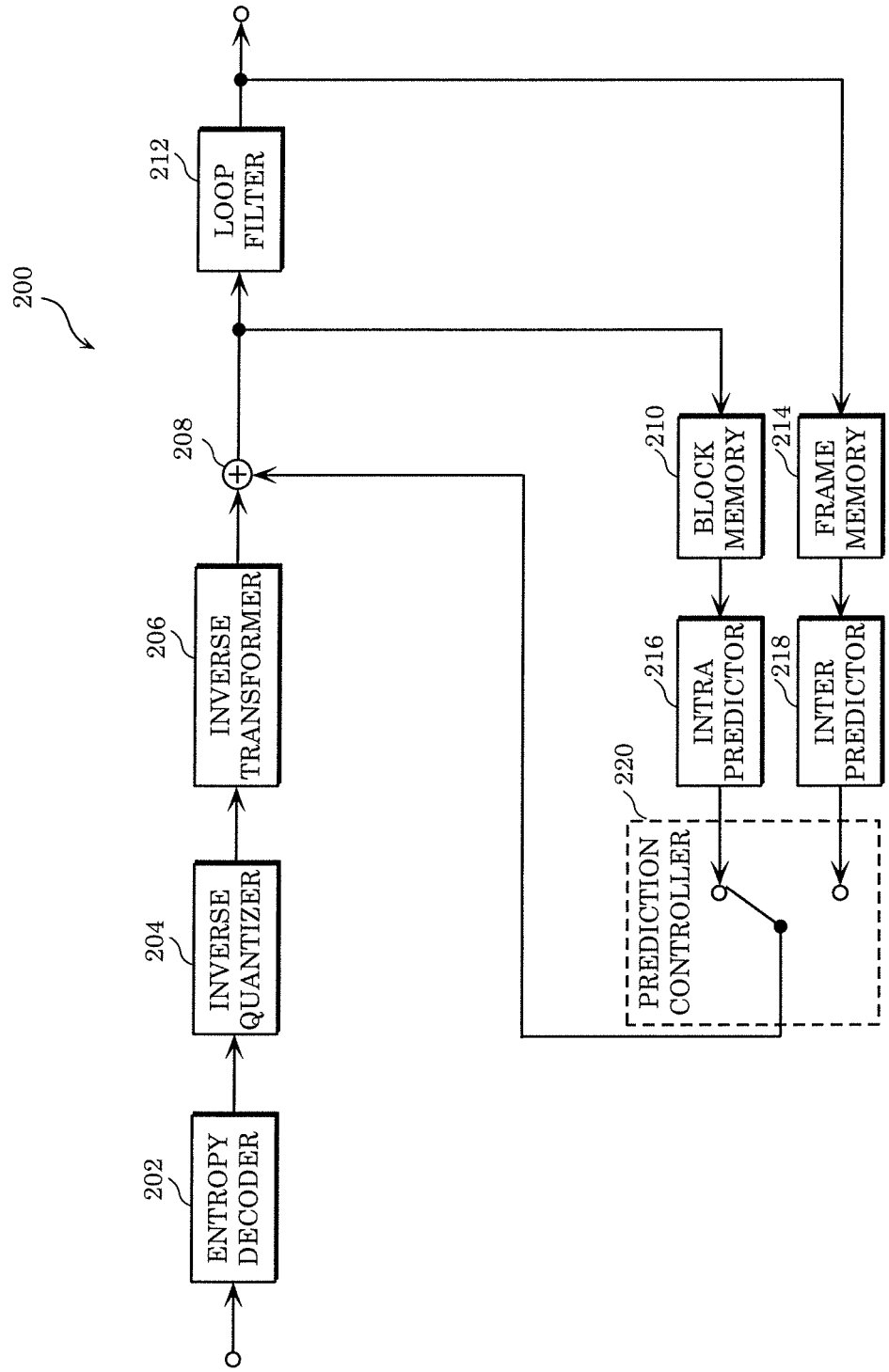
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

Embodiment 2

Encoder 100 and decoder 200 according to the present embodiment have the configurations illustrated in FIG. 1 and FIG. 10, respectively as described in Embodiment 1.

Loop filter 120 in encoder 100 according to the present embodiment applies a filter to a current block which is a reconstructed block, and outputs, to frame memory 122, the block to which the filter has been applied, as described in Embodiment 1. Loop filter 212 in decoder 200 also applies a filter to a current block which is a reconstructed block, and outputs the block to which the filter has been applied, as described in Embodiment 1. This filter includes least square error filters such as a sample adaptive offset (SAO) filter and an adaptive loop filter (ALF). In other words, the filter is for minimizing a difference between an image of a block to which the filter has been applied and its original image.

A filter tap is used in the application of such a filter. In other words, a filter tap is used in the application of a filter, such as an ALF, to a pixel in a current block to be processed, that is, a current pixel. The filter tap consists of a current pixel and pixels around the current pixel. A region that includes pixels including the current pixel is, for example, a region illustrated in FIG. 4A, FIG. 4B, or FIG. 4C. Specifically, when pixel C20 located at the center of a diamond-shaped region illustrated in FIG. 4C is a current pixel, each of pixels in the diamond-shaped region is used in the application of a filter to pixel C20.

In encoder 100 or decoder 200 according to the present embodiment, a referable region is defined. The referable region is a region including a current block and the vicinity of the current block. The vicinity of the current block is a surrounding area from the boundary of the current block up to a predetermined number of pixels from the boundary. The predetermined number of pixels is, for example, four pixels. Encoder 100 or decoder 200 according to the present embodiment has a memory capable of holding information about each of pixels in a referable region. Note that the predetermined number of pixels may be less than four or at least five pixels.

Generally speaking, when pixels used as a filter tap are located in a referable region, an encoder or a decoder is capable of reading out, from a memory, information about the pixels to use the information and applying a filter to a current pixel. When, however, the information about the pixels is not in the memory, it is assumed that it is not possible to apply a filter to the current pixel. In view of this, by broadly defining a referable region, it is possible to prevent a filter from becoming inapplicable. Nevertheless, a broader definition of a referable region requires a larger memory capacity. In other words, there is much to be improved in terms of reduction in memory capacity.

Therefore, when one or more of pixels to be used as a filter tap are not located in a referable region, that is, when the filter tap extends beyond the boundary of the referable region, encoder 100 or decoder 200 according to the present embodiment extrapolates the pixels located outside the referable region. In other words, encoder 100 or decoder 200 interpolates the pixels that are located outside the referable region and are to be used as a filter tap, using pixels located in the referable region. Namely, encoder 100 or decoder 200 extrapolates the pixel values of the pixels located outside the referable region. This can promote reduction in memory capacity. Encoder 100 or decoder 200 then applies a filter that uses the interpolated pixels to a current block to be processed, more specifically, to a current pixel in the current block.

Furthermore, encoder 100 or decoder 200 determines, according to a characteristic of a current block, an interpolation method for interpolating pixels located outside a referable region and interpolates the pixels using the determined interpolation method. This can approximate the pixel values of pixels obtained through the interpolation to the pixel values of actual pixels located outside the referable region in a reconstructed image. As a result, filtering accuracy can be enhanced.

For example, the determination of an interpolation method, pixel interpolation, and filter application using interpolated pixels, as described above, are performed by loop filter 120 or 212. The following describes in detail loop filter 120 in encoder 100 according to the present embodiment as described above. It should be noted that since loop filter 212 in decoder 200 performs the same processing operation as that performed by loop filter 120, the detailed description thereof is omitted.

[Interpolation Method of Interpolating Pixels According to Gradient]

Figure 11:
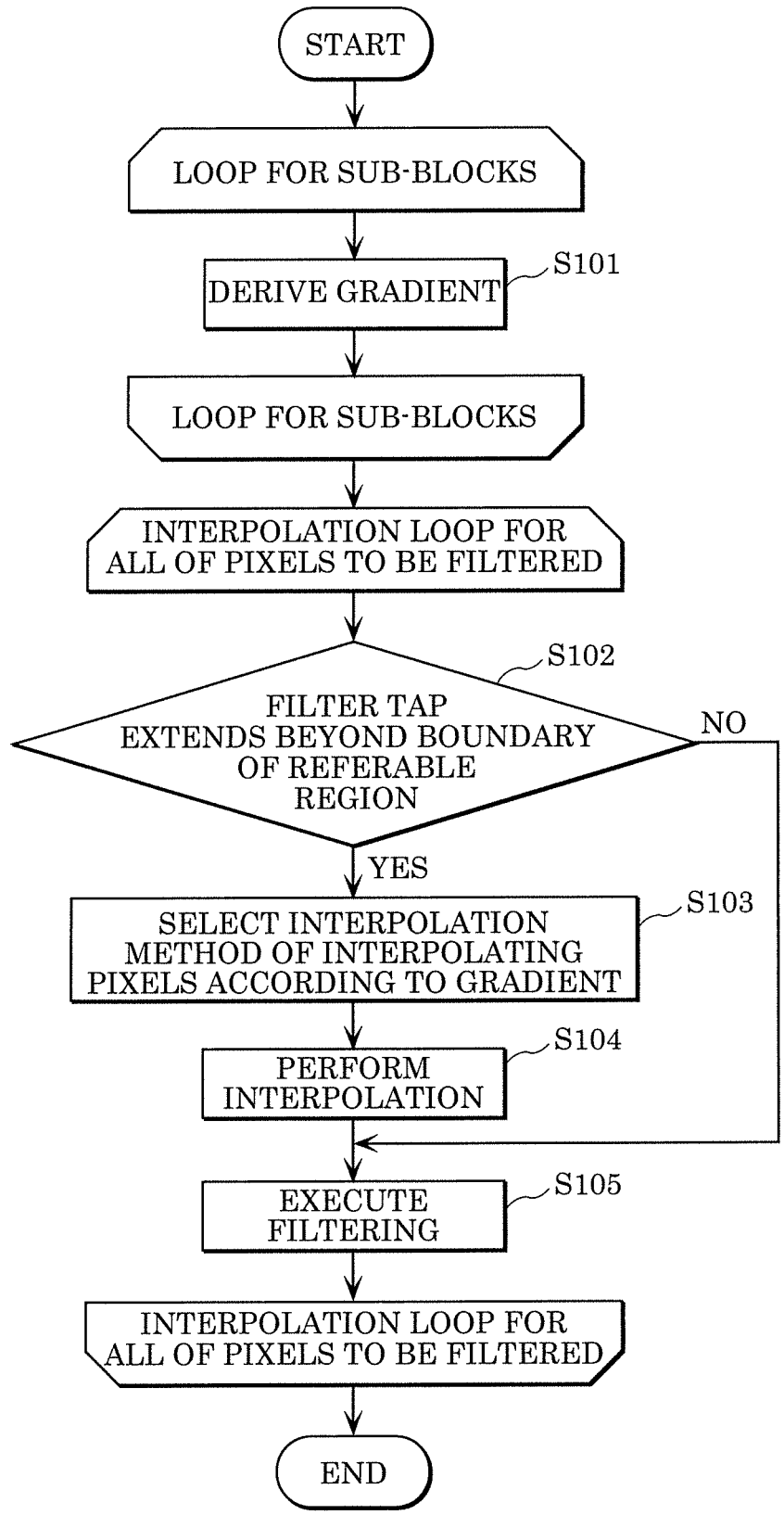
FIG. 11 illustrates one example of filtering performed by a loop filter according to Embodiment 2.

FIG. 11 illustrates one example of filtering performed by loop filter 120 according to the present embodiment.

First, loop filter 120 derives a gradient of an image of each of sub-blocks included in a current block to be processed (step S101). In other words, gradient directionality is derived. A sub-block is, for example, a 2×2 pixel block.

Subsequently, loop filter 120 executes an interpolation loop for filtering all of pixels to be filtered. Specifically in the interpolation loop, before filtering a current pixel, loop filter 120 determines whether a filter tap of the current pixel extends beyond the boundary of a referable region (step S102).

When determining that the filter tap extends beyond the boundary of the referable region (Yes in step S102), loop filter 120 selects, from among a plural types of interpolation methods, an interpolation method of interpolating pixels according to a gradient derived for a sub-block including the current pixel (step S103). In this way, an interpolation method of interpolating pixels according to a characteristic of a block, that is, gradient directionality, is determined. The interpolation method is, as described above, a method for interpolating pixels placed outside the boundary of a referable region.

Subsequently, loop filter 120 performs interpolation using the selected interpolation method (step S104). In other words, loop filter 120 interpolates the pixels located outside the referable region using the selected interpolation method. Loop filter 120 then executes filtering on the current pixel using filter coefficients and pixels including the current pixel which are included in the filter tap (step S105). In other words, loop filter 120 applies a filter such as an ALF or an SAO filter to the current pixel. Note that the filter coefficients to be used for the filter are determined by encoder 100 based on, for example, an original image, and are included in an encoded bitstream. In step S102, when determining that the filter tap does not extend beyond the boundary of the referable region (No in step S102), loop filter 120 executes filtering without carrying out the selection of an interpolation method and an interpolation process (step S105).

Thus, encoder 100 according to the present embodiment encodes and reconstructs an image to generate a reconstructed image, and determines, according to a characteristic of a block of the reconstructed image, an interpolation method for interpolating pixels located outside a referable region including the block. Encoder 100 then interpolates the pixels located outside the referable region using the determined interpolation method, and applies a filter to the block using the interpolated pixels. For example, in the determination of the interpolation method, encoder 100 determines the interpolation method by selecting an interpolation method from among a plurality of interpolation methods based on a parameter indicating a characteristic of the block. In the example illustrated in FIG. 11, the parameter indicates gradient directionality of an image in a block.

With this, when pixels located outside a referable region are necessary for filter application to a block, the pixels are interpolated using one or more pixels in the referable region, therefore, there is no need to store actual pixels located outside the referable region in a reconstructed image. Accordingly, memory capacity may be reduced. Moreover, since the pixels are interpolated using an interpolation method determined according to a characteristic of the block, it is possible to interpolate pixels having more appropriate pixel values compared to the case of interpolating pixels using a fixed interpolation method irrespective of a characteristic of a block. In other words, it is possible to approximate the pixel values of pixels obtained through the interpolation to the pixel values of actual pixels located outside the referable region in the reconstructed image. As a result, filtering accuracy can be enhanced. Moreover, since gradient directionality of an image in a block is used as a characteristic of the block, it is possible to extensively apply a gradient or edge of the image even to an area outside the referable region.

[Padding Process and Mirroring Process]

The interpolation method of interpolating pixels according to a gradient, which is determined in step S103, includes at least one of a padding process and a mirroring process, for example.

Figure 12:
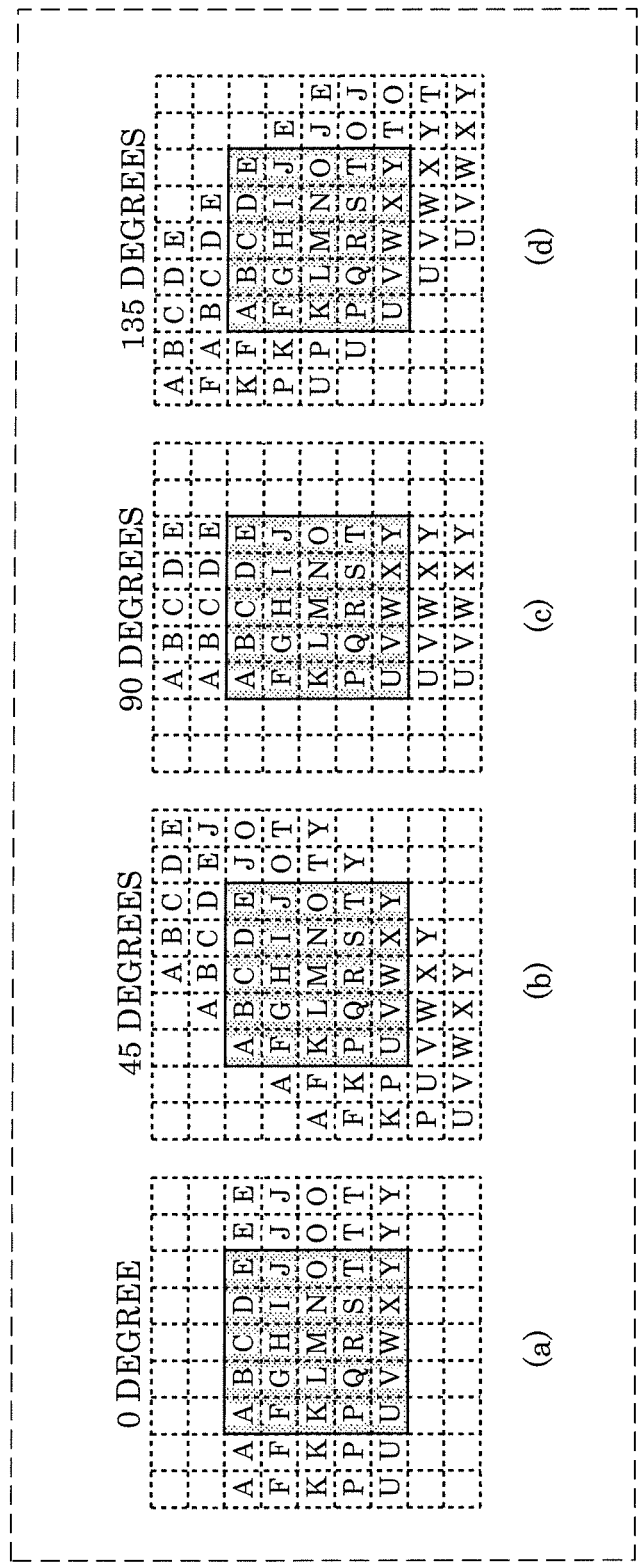
FIG. 12 illustrates concrete examples of a padding process according to Embodiment 2.

FIG. 12 illustrates concrete examples of a padding process. In FIG. 12, each of hatched regions indicates a referable region and each of square regions assigned with alphabets indicates a pixel. The square regions assigned with the same alphabets indicate pixels having the same pixel values.

For example, loop filter 120 is capable of deriving one of four directions as gradient directionality, that is, local gradient directionality of a sub-block. The four directions are, for example, a 0-degree direction, a 45-degree direction, a 90-degree direction, and a 135-degree direction. The 0-degree direction is a horizontal direction, a 90-degree direction is a vertical direction, and the angle of a gradient increases in a counterclockwise direction. Such gradient directionalities are used in a padding process and a mirroring process.

In the padding process, loop filter 120 copies a copy source pixel located in a referable region and adjacent to the boundary of the referable region. Thus, loop filter 120 interpolates at least one pixel that is placed outside the referable region and aligned with the copy source pixel along a predetermined direction and that has a pixel value equal to that of the copy source pixel. The predetermined direction here is gradient directionality or a direction vertical to the gradient directionality. In other words, the predetermined direction is, for example, a 0-degree direction, a 45-degree direction, a 90-degree direction, or a 135-degree direction.

Specifically, when the predetermined direction is a 0-degree direction, loop filter 120 copies, for example, pixel A which is a copy source pixel in a referable region, as illustrated in (a) in FIG. 12. Loop filter 120 then places pixels obtained through the copying, that is, pixels A (e.g., two pixels A) each having a pixel value equal to that of the copy source pixel A, outside the referable region and aligned with the copy source pixel A along the 0-degree direction.

When the predetermined direction is a 45-degree direction, loop filter 120 copies, for example, pixel D which is a copy source pixel in the referable region, as illustrated in (b) in FIG. 12. Loop filter 120 then places pixels obtained through the copying, that is, pixels D (e.g., two pixels D) each having a pixel value equal to that of the copy source pixel D, outside the referable region and aligned with the copy source pixel D along the 45-degree direction.

When the predetermined direction is a 90-degree direction or a 135-degree direction, loop filter 120 performs a padding process as illustrated in (c) or (d) in FIG. 12, as is the case where the predetermined direction is a 0-degree direction or a 45-degree direction.

Figure 13:
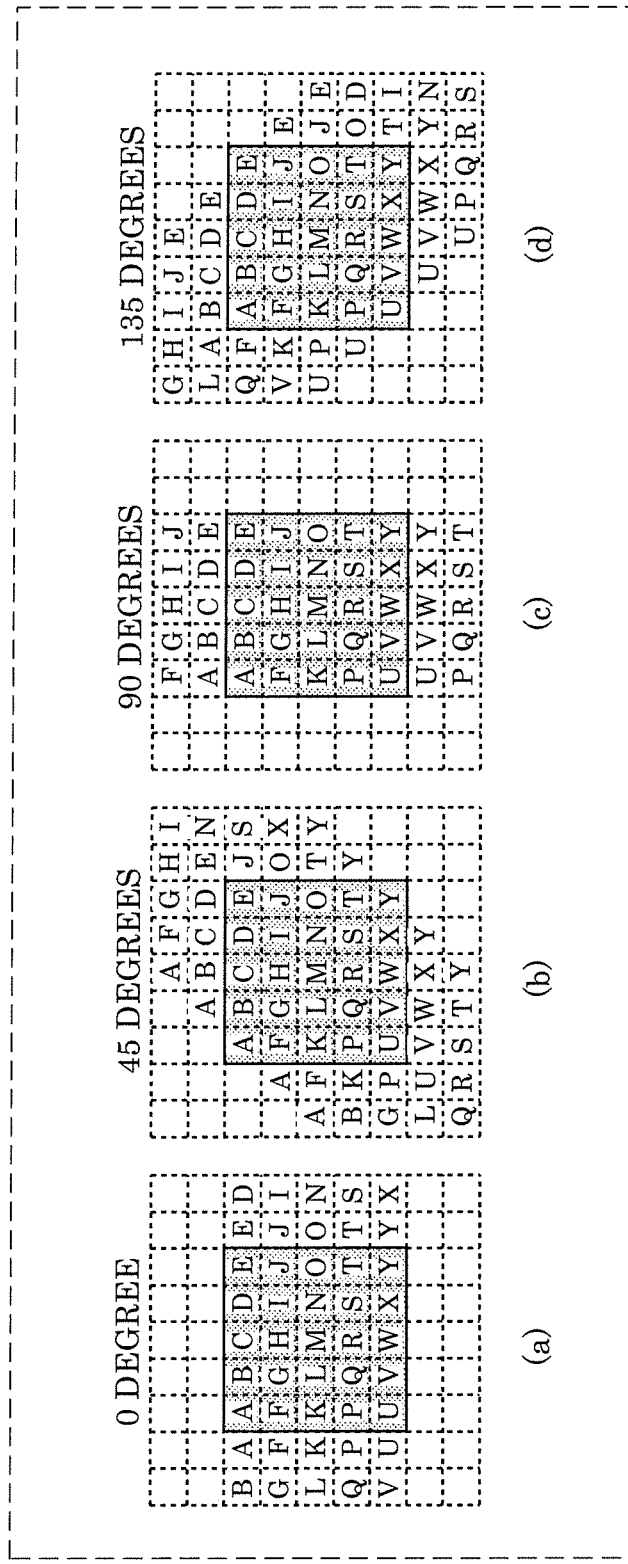
FIG. 13 illustrates concrete examples of a mirroring process according to Embodiment 2.

FIG. 13 illustrates concrete examples of a mirroring process. In FIG. 13, each of the hatched regions indicates a referable region and each of the square regions assigned with alphabets indicates a pixel, as in FIG. 12. The square regions assigned with the same alphabets indicate pixels having the same pixel values.

In the mirroring process, loop filter 120 copies N (N is an integer greater than or equal to 1) copy source pixels placed in a referable region along a predetermined direction. Thus, loop filter 120 interpolates N pixels placed outside the referable region, aligned with the N copy source pixels along the predetermined direction, and symmetric to the N copy source pixels with respect to the boundary of the referable region. Each of the N pixels has a pixel value equal to that of a corresponding one of the N copy source pixels. The predetermined direction is gradient directionality or a direction vertical to the gradient directionality, as has been described above. In other words, the predetermined direction is, for example, a 0-degree direction, a 45-degree direction, a 90-degree direction, or a 135-degree direction.

Specifically when the predetermined direction is a 0-degree direction, loop filter 120 copies, for example, two copy source pixels of pixel A and pixel B placed in a referable region along the 0-degree direction, as illustrated in (a) in FIG. 13. Loop filter 120 then places, outside the referable region, two pixels obtained through the copying, that is, pixel A having a pixel value equal to that of the copy source pixel A and pixel B having a pixel value equal to that of the copy source pixel B. Loop filter 120 places the pixels A and B obtained through the copying so that they are aligned, outside the referable region, with the two copy source pixels A and B along the 0-degree direction and are symmetric to the two copy source pixels A and B with respect to the boundary of the referable region.

When the predetermined direction is a 45-degree direction, loop filter 120 copies two copy source pixels of pixel B and pixel F placed in the referable region along the 45-degree direction, as illustrated in (b) in FIG. 13. Loop filter 120 then places, outside the referable region, two pixels obtained through the copying, that is, pixel B having a pixel value equal to that of the copy source pixel B and pixel F having a pixel value equal to that of the copy source pixel F. Loop filter 120 places the pixels B and F obtained through the copying so that they are aligned, outside the referable region, with the two copy source pixels B and F along the 45-degree direction and are symmetric to the two copy source pixels B and F with respect to the boundary of the referable region.

When the predetermined direction is a 90-degree direction or a 135-degree direction, loop filter 120 performs a mirroring process as illustrated in (c) or (d) in FIG. 13, as is the case where the predetermined direction is a 0-degree direction or a 45-degree direction.

Thus, the interpolation method determined in step S103 according to the present embodiment includes at least one of a padding process and a mirroring process. As described above, the padding process is a process of copying a copy source pixel that is located in a referable region and adjacent to the boundary of the referable region, to interpolate at least one pixel that is placed outside the referable region and aligned with the copy source pixel along a predetermined direction and that has a pixel value equal to that of the copy source pixel. In contrast, the mirroring process is a process of copying N copy source pixels placed in a referable region along a predetermined direction, to interpolate N pixels placed outside the referable region, aligned with the N copy source pixels along the predetermined direction, and symmetric to the N copy source pixels with respect to the boundary of the referable region. Each of the N pixels has a pixel value equal to that of a corresponding one of the N copy source pixels. The above-described predetermined direction is a direction according to a characteristic of a block. The predetermined direction is, for example, gradient directionality derived in step S101 or a direction vertical to the gradient directionality. This makes it possible to easily interpolate pixels having appropriate pixel values.

[Bi-Directional Interpolation]

Performing only unidirectional pixel interpolation, that is, pixel interpolation along gradient directionality or along a direction vertical to the gradient directionality cannot interpolate all of pixels that need to be interpolated. When a filter tap extends beyond a referable region in an upper or lower direction, for example, pixels necessary for filter application cannot be obtained by performing only pixel interpolation along a 0-degree direction.

In view of this, in the present embodiment, loop filter 120 may select an interpolation method of interpolating pixels along two directions in step S103 shown in FIG. 11.

Figure 14:
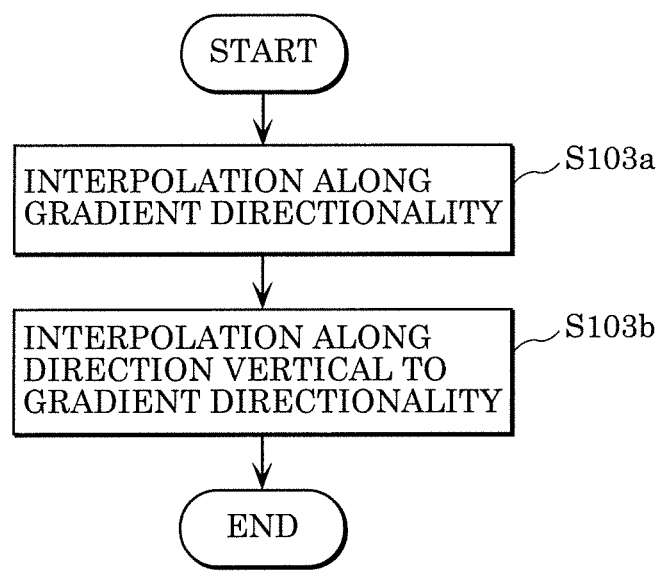
FIG. 14 illustrates one example of selection of an interpolation method according to Embodiment 2.

FIG. 14 illustrates one example of selection of an interpolation method, which is performed in step S103 in FIG. 11.

As illustrated in FIG. 14, for example, loop filter 120 selects an interpolation method of interpolating pixels along two directions. The interpolation method includes a process of interpolating pixels along gradient directionality derived in step S101 (step S103a) and a process of subsequently interpolating pixels in a direction vertical to the gradient directionality (step S103b). The pixel interpolation along gradient directionality is interpolation along a direction parallel to the gradient directionality. Each of the pixel interpolation along gradient directionality and the pixel interpolation along a direction vertical to the gradient directionality may be a padding process or a mirroring process.

Hereinafter, the process in step S103a is referred to as a first interpolation process and the process in step S103b is referred to as a second interpolation process.

Thus, the interpolation method determined in the present embodiment includes: a first interpolation process of interpolating at least one pixel placed along the gradient directionality; and a second interpolation process of interpolating, after the first interpolation process, at least one pixel placed along a direction vertical to the gradient directionality.

This makes it possible to obtain pixels necessary for filter application even when a filter tap extends beyond a referable region in an upper or lower direction as described above since pixel interpolation is performed not only along a 0-degree direction but also along a 90-degree direction. Furthermore, it is possible to obtain pixels necessary for filter application even when a filter tap extends beyond a referable region not in an upper, lower, left, or right direction, but in an upper left, upper right, lower left, or lower right direction.

Accordingly, appropriate pixels can be interpolated in the vicinity of the referable region without any pixel left to be interpolated. In other words, a pixel located outside the referable region and interpolated in the first interpolation process can be used for the second interpolation process. In the second interpolation process, for example, a pixel in a referable region and a pixel that is located outside the referable region and is interpolated in the first interpolation process are both copied so that at least one pixel placed along a direction vertical to gradient directionality can be interpolated. This makes it possible to extensively apply, appropriately and without any pixel left to be interpolated, a characteristic, e.g., gradient or edge, of an image in a block even to the vicinity of a referable region.

[Padding and Padding]

Figure 15:
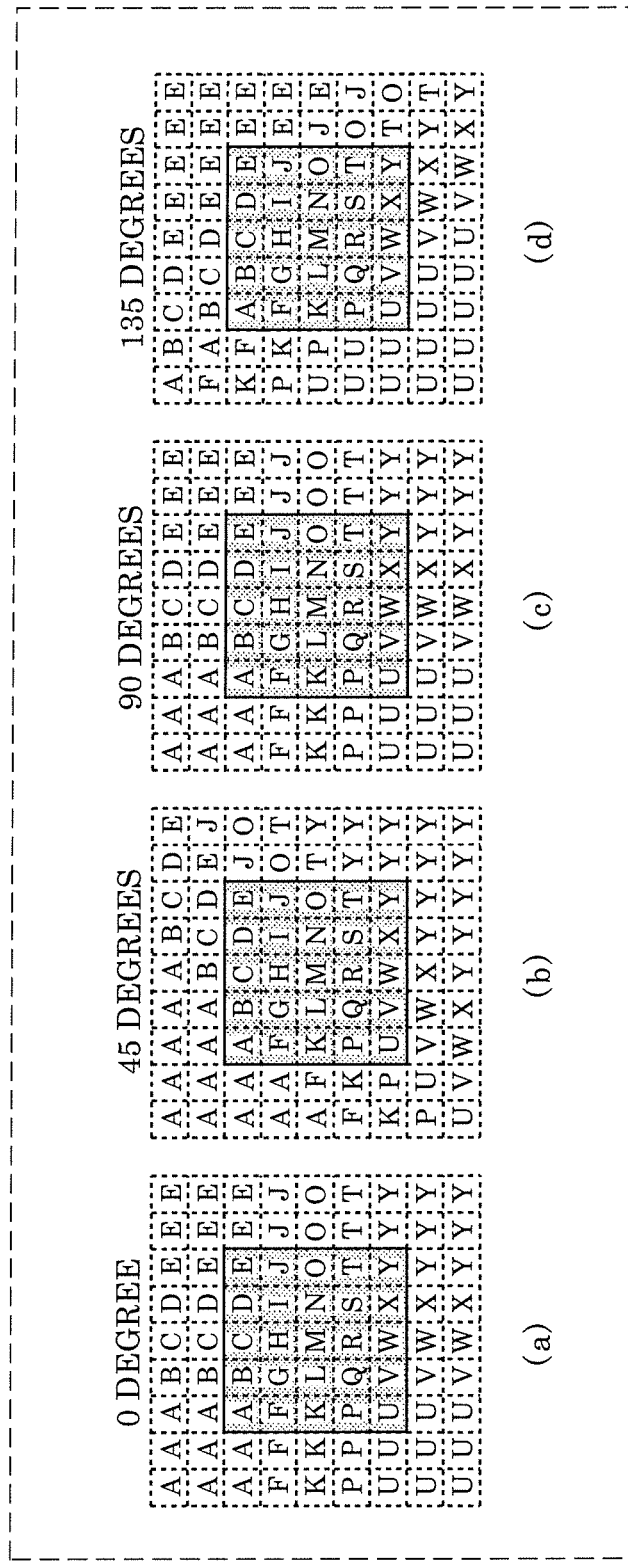
FIG. 15 illustrates examples of an interpolation method in which a padding process is performed in each of a first interpolation process and a second interpolation process according to Embodiment 2.

FIG. 15 illustrates examples of an interpolation method in which a padding process is performed in each of the first interpolation process and the second interpolation process.

In the first interpolation process, loop filter 120 performs a padding process along gradient directionality. In other words, loop filter 120 copies a copy source pixel to interpolate at least one pixel that is placed outside a referable region and aligned with the copy source pixel along gradient directionality and that has a pixel value equal to that of the copy source pixel. Subsequently, in the second interpolation process, loop filter 120 performs a padding process along a direction vertical to the gradient directionality. In other words, loop filter 120 copies a copy source pixel to interpolate at least one pixel that is placed outside the referable region and aligned with the copy source pixel along the direction vertical to the gradient directionality and that has a pixel value equal to that of the copy source pixel.

Specifically, in the first interpolation process, when gradient directionality is a 0-degree direction, loop filter 120 copies copy source pixel A located in a referable region, to interpolate two pixels A placed aligned with the copy source pixel A along the 0-degree direction, as illustrated in (a) in FIG. 15. Subsequently, in the second interpolation process, loop filter 120 copies copy source pixel A to interpolate two pixels A placed aligned with the copy source pixel A along a 90-degree direction, as illustrated in (a) in FIG. 15.

In the second interpolation process, the copy source pixel A may be pixel A located in the referable region or pixel A placed outside the referable region through the first interpolation process. This makes it possible to interpolate 2×2 pixels A located in the upper left of the referable region. Accordingly, appropriate pixels can be interpolated outside the referable region without any pixel left to be interpolated.

Similarly, even in the case where gradient directionality is a 45-degree direction, a 90-degree direction, or a 135-degree direction, loop filter 120 performs each of the first interpolation process and the second interpolation process using a padding process, as illustrated in (b), (c), or (d) in FIG. 15, as is the case where gradient directionality is a 0-degree direction.

[Padding and Mirroring]

Figure 16:
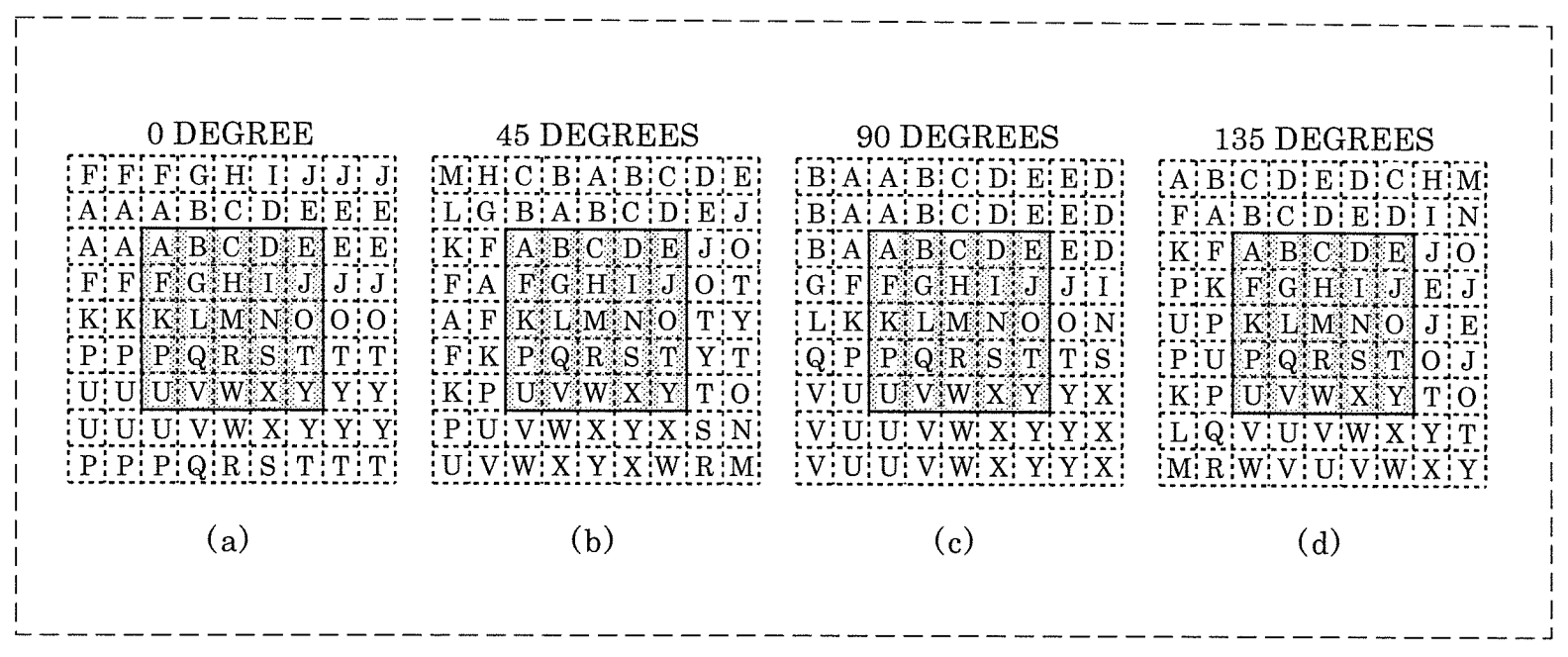

FIG. 16 illustrates examples of an interpolation method in which a padding process is performed in the first interpolation process and a mirroring process is performed in the second interpolation process.

In the first interpolation process, loop filter 120 performs a padding process along gradient directionality. In other words, loop filter 120 copies a copy source pixel to interpolate at least one pixel that is placed outside a referable region and aligned with the copy source pixel along the gradient directionality and that has a pixel value equal to that of the copy source pixel. Subsequently, in the second interpolation process, loop filter 120 performs a mirroring process along a direction vertical to the gradient directionality. In other words, loop filter 120 copies N (e.g. two) copy source pixels placed in the referable region along the direction vertical to the gradient directionality. Thus, loop filter 120 interpolates N pixels each having a pixel value equal to that of a corresponding one of the N copy source pixels. The N pixels thus interpolated are placed aligned with the N copy source pixels along the direction vertical to the gradient directionality and symmetric to the N copy source pixels with respect to the boundary of the referable region.

Specifically, in the first interpolation process, when gradient directionality is a 0-degree direction, loop filter 120 copies copy source pixel A in a referable region to interpolate two pixels A placed aligned with the copy source pixel A along the 0-degree direction, as illustrated in (a) in FIG. 16. Subsequently, in the second interpolation process, loop filter 120 performs a mirroring process along a 90-degree direction, as illustrated in (a) in FIG. 16. In other words, loop filter 120 copies two copy source pixels of pixel A and pixel F that are placed in the referable region along the 90-degree direction. Thus, loop filter 120 interpolates, outside the referable region, two pixels of pixel A having a pixel value equal to that of the copy source pixel A and pixel F having a pixel value equal to that of the copy source pixel F. The two pixels A and F interpolated are placed aligned with the copy source pixels A and F along the 90-degree direction and symmetric to the copy source pixels A and F with respect to the boundary of the referable region.

In the second interpolation process, the copy source pixels A and F may be pixel A and pixel F located in a referable region or pixel A and pixel F placed outside the referable region through the first interpolation process. This makes it possible to interpolate two pixels A and two pixels F which are located in the upper left of the referable region. Accordingly, pixels can be interpolated outside the referable region without any pixel left to be interpolated.

Similarly, even in the case where gradient directionality is a 45-degree direction, a 90-degree direction, or a 135-degree direction, loop filter 120 performs the first interpolation process using a padding process and the second interpolation process using a mirroring process, as illustrated in (b), (c), or (d) in FIG. 16, as is the case where gradient directionality is a 0-degree direction.

[Mirroring and Padding]

Figure 17:
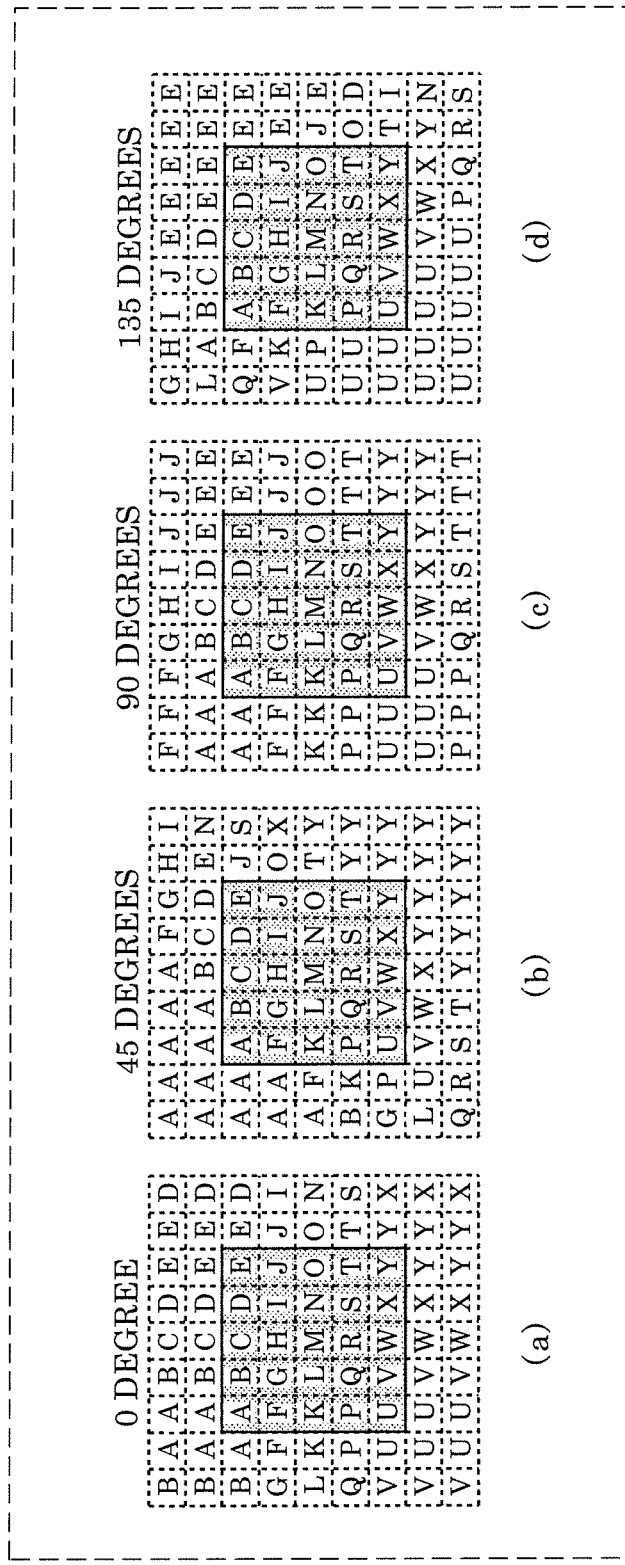
FIG. 17 illustrates examples of an interpolation method in which a mirroring process is performed in the first interpolation process and a padding process is performed in the second interpolation process according to Embodiment 2.

FIG. 17 illustrates examples of an interpolation method in which a mirroring process is performed in the first interpolation process and a padding process is performed in the second interpolation process.

In the first interpolation process, loop filter 120 performs a mirroring process along gradient directionality. In other words, loop filter 120 copies N (e.g. two) copy source pixels placed in a referable region along the gradient directionality. Thus, loop filter 120 interpolates, outside the referable region, N pixels each having a pixel value equal to that of a corresponding one of the N copy source pixels. The N pixels thus interpolated are placed aligned with the N copy source pixels along the gradient directionality and symmetric to the N copy source pixels with respect to the boundary of the referable region. Subsequently, in the second interpolation process, loop filter 120 performs a padding process along a direction vertical to the gradient directionality. In other words, loop filter 120 copies a copy source pixel to interpolate at least one pixel that is placed outside the referable region aligned with the copy source pixel along the direction vertical to the gradient directionality and that has a pixel value equal to that of the copy source pixel.

Specifically, in the first interpolation process, when gradient directionality is a 0-degree direction, loop filter 120 performs a mirroring process along the 0-degree direction, as illustrated in (a) in FIG. 17. In other words, loop filter 120 copies two copy source pixels of pixel A and pixel B that are placed in the referable region along the 0-degree direction. Thus, loop filter 120 interpolates, outside the referable region, two pixels of pixel A having a pixel value equal to that of the copy source pixel A and pixel B having a pixel value equal to that of the copy source pixel B. The two pixels A and B interpolated are placed aligned with the copy source pixels A and B along the 0-degree direction and symmetric to the copy source pixels A and B with respect to the boundary of the referable region. Subsequently, in the second interpolation process, loop filter 120 copies copy source pixel A to interpolate two pixels A placed aligned with the copy source pixel A along a 90-degree direction, as illustrated in (a) in FIG. 17. Furthermore, loop filter 120 copies copy source pixel B to interpolate two pixels B placed aligned with the copy source pixel B in the 90-degree direction.

In the second interpolation process, the copy source pixels A and B may be pixel A and pixel B located in the referable region or pixel A and pixel B placed outside the referable region through the first interpolation process. This makes it possible to interpolate two pixels A and two pixels B which are located in the upper left of the referable region. Accordingly, pixels can be interpolated outside the referable region without any pixel left to be interpolated.

Similarly, even in the case where gradient directionality is a 45-degree direction, a 90-degree direction, or a 135-degree direction, loop filter 120 performs the first interpolation process using a mirroring process and the second interpolation process using a padding process, as illustrated in (b), (c), or (d) in FIG. 17, as is the case where gradient directionality is a 0-degree direction.

[Mirroring and Mirroring]

Figure 18:
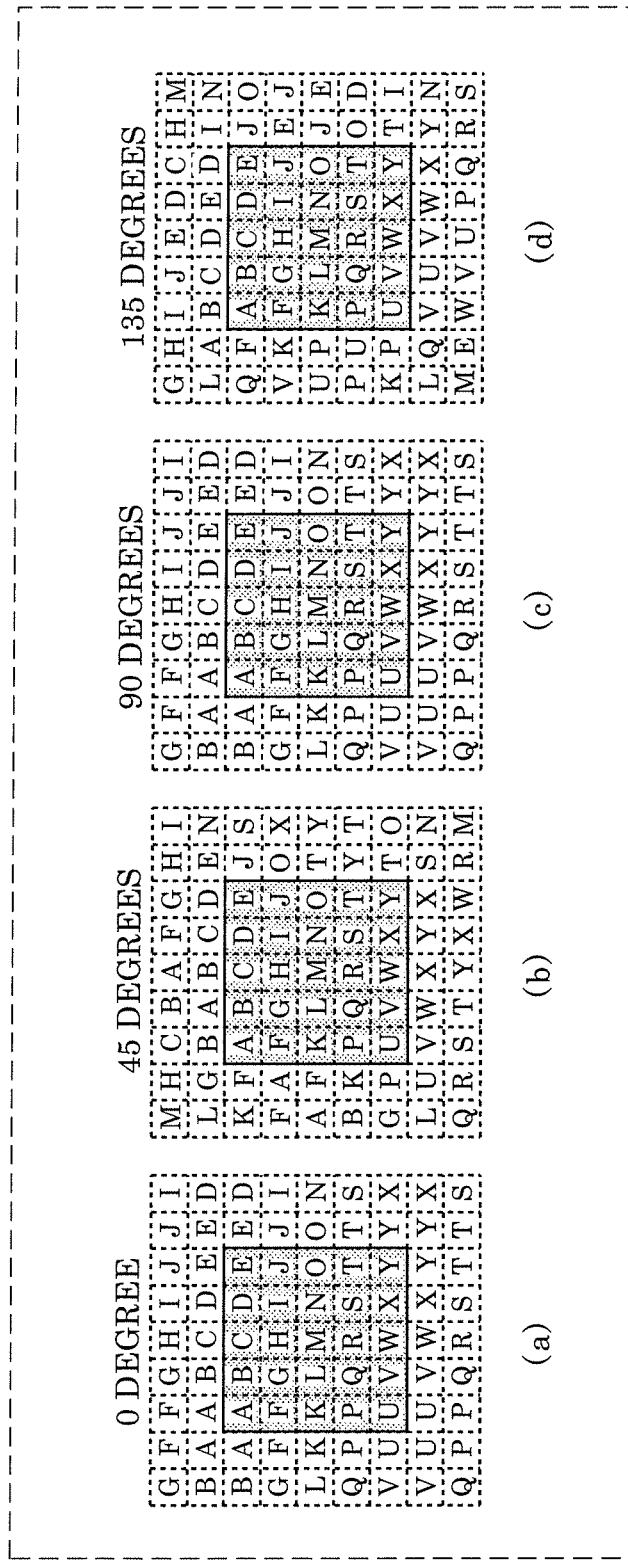
FIG. 18 illustrates examples of an interpolation method in which a mirroring process is performed in each of the first interpolation process and the second interpolation process according to Embodiment 2.

FIG. 18 illustrates examples of an interpolation method in which a mirroring process is performed in each of the first interpolation process and the second interpolation process.

In the first interpolation process, loop filter 120 performs a mirroring process along gradient directionality. In other words, loop filter 120 copies N (e.g. two) copy source pixels placed in a referable region along the gradient directionality.

Thus, loop filter 120 interpolates, outside the referable region, N pixels each having a pixel value equal to that of a corresponding one of the N copy source pixels. The N pixels thus interpolated are placed aligned with the N copy source pixels along the gradient directionality and symmetric to the N copy source pixels with respect to the boundary of the referable region. Subsequently, in the second interpolation process, loop filter 120 performs a mirroring process along a direction vertical to the gradient directionality. In other words, loop filter 120 copies N (e.g., two) copy source pixels placed in the referable region along the direction vertical to the gradient directionality. Thus, loop filter 120 interpolates, outside the referable region, N pixels each having a pixel value equal to that of a corresponding one of the N copy source pixels. The N pixels thus interpolated are placed aligned with the N copy source pixels along the direction vertical to the gradient directionality and symmetric to the N copy source pixels with respect to the boundary of the referable region.

Specifically, in the first interpolation process, when gradient directionality is a 0-degree direction, loop filter 120 performs a mirroring process along the 0-degree direction, as illustrated in (a) in FIG. 18. In other words, loop filter 120 copies two copy source pixels of pixel A and pixel B that are placed in the referable region along the 0-degree direction. Thus, loop filter 120 interpolates, outside the referable region, two pixels of pixel A having a pixel value equal to that of the copy source pixel A and pixel B having a pixel value equal to that of the copy source pixel B. The two pixels A and B interpolated are placed aligned with the copy source pixels A and B along the 0-degree direction and symmetric to the copy source pixels A and B with respect to the boundary of the referable region. Furthermore, loop filter 120 copies two copy source pixels of pixel F and pixel G that are placed in the referable region along the 0-degree direction. Thus, loop filter 120 interpolates, outside the referable region, two pixels of pixel F having a pixel value equal to the copy source pixel F and pixel G having a pixel value equal to that of the copy source pixel G. The two pixels F and G interpolated are placed aligned with the copy source pixels F and G along the 0-degree direction and symmetric to the copy source pixels F and G with respect to the boundary of the referable region.

Subsequently, in the second interpolation process, loop filter 120 performs a mirroring process along a 90-degree direction, as illustrated in (a) in FIG. 18. In other words, loop filter 120 copies two copy source pixels of pixel A and pixel F that are placed in the referable region along the 90-degree direction. Thus, loop filter 120 interpolates, outside the referable region, two pixels of pixel A having a pixel value equal to that of the copy source pixel A and pixel F having a pixel value equal to that of the copy source pixel F. The two pixels A and F interpolated are placed aligned with the copy source pixels A and F along the 90-degree direction and symmetric to the copy source pixels A and F with respect to the boundary of the referable region. Furthermore, loop filter 120 copies two copy source pixels of pixel B and pixel G that are placed in the referable region along the 90-degree direction. Thus, loop filter 120 interpolates, outside the referable region, two pixels of pixel B having a pixel value equal to that of the copy source pixel B and pixel G having a pixel value equal to that of the copy source pixel G. The two pixels B and G interpolated are placed aligned with the copy source pixels B and G along the 90-degree direction and symmetric to the copy source pixels B and G with respect to the boundary of the referable region.

In the second interpolation process, the copy source pixels A and F may be pixel A and pixel F located in the referable region or pixel A and pixel F placed outside the referable region through the first interpolation process. Furthermore, in the second interpolation process, the copy source pixels B and G may be pixel B and pixel G located in the referable region or pixel B and pixel G placed outside the referable region through the first interpolation process. This makes it possible to interpolate pixel A, pixel B, pixel F, and pixel G located in the upper left of the referable region. Accordingly, pixels can be interpolated outside the referable region without any pixel left to be interpolated.

Similarly, even in the case where gradient directionality is a 45-degree direction, a 90-degree direction, or a 135-degree direction, loop filter 120 performs each of the first interpolation process and the second interpolation process using a padding process as illustrated in (b), (c), or (d) in FIG. 18, as is the case where gradient directionality is a 0-degree direction.

Thus, in the present embodiment, an interpolation method is switched from one to another according to a characteristic of a block, more specifically, gradient directionality of an image in the block. Accordingly, it is possible to prevent performance degradation of a least square error filter caused by unnatural extrapolation such that an edge direction of an object is ignored, compared to the case of not switching between interpolation methods, and this can promote the improvement of coding efficiency.

Moreover, comparing between effects obtained by a mirroring process and those obtained by a paddling process, the mirroring process may enhance interpolation accuracy when a cyclical change in pixel values is repeated in an image displaying an object. In contrast, the paddling process may enhance interpolation accuracy when the structure of an image does not change and extends straightly. Accordingly, coding efficiency may be greatly improved by adaptively using a mirroring process and a paddling process according to a condition for determining an interpolation method. When an interpolation method of interpolating pixels according to the gradient of a pixel value is determined, as in the example described above, the edge of an object may have a gradient. Accordingly, it is conceivable to use a padding process instead of a mirroring process.

In the above-described example, a 0-degree direction, a 45-degree direction, a 90-degree direction, or a 135-degree direction is raised as an example of gradient directionality or a direction vertical to the gradient directionality, but a direction other than these may be used. In the selection of an interpolation method, an interpolation method associated with gradient directionality of a sub-block including a current pixel may be selected from a plurality of combinations in each of which gradient directionality is associated with an interpolation method.

In the selection of an interpolation method of interpolating pixels according to a gradient, an interpolation method, in which not only interpolation performed along gradient directionality or along a direction vertical to the gradient directionality, but also interpolation performed along a different direction such as a horizontal direction or a vertical direction is combined, may be selected.

In unidirectional interpolation, that is, interpolation performed along gradient directionality or along a direction vertical to the gradient directionality, pixels are interpolated using a padding process or a mirroring process, but interpolation using a padding process and a mirroring process in combination may be performed.

The second interpolation process may be performed where necessary or always after the first interpolation process. In other words, loop filter 120 may determine whether pixels necessary for filter application can be obtained only through the first interpolation process. When determining that the pixels cannot be obtained only through the first interpolation, loop filter 120 may perform the second interpolation process. Namely, a step of determining whether a pixel included in a filter tap is interpolated may be provided after the first interpolation process.

[Interpolation Method of Interpolating Pixels According to Class]

In the above-described example, an interpolation method of interpolating pixels according to gradient directionality is determined, but an interpolation method of interpolating pixels according to a class may be determined.

Figure 19:
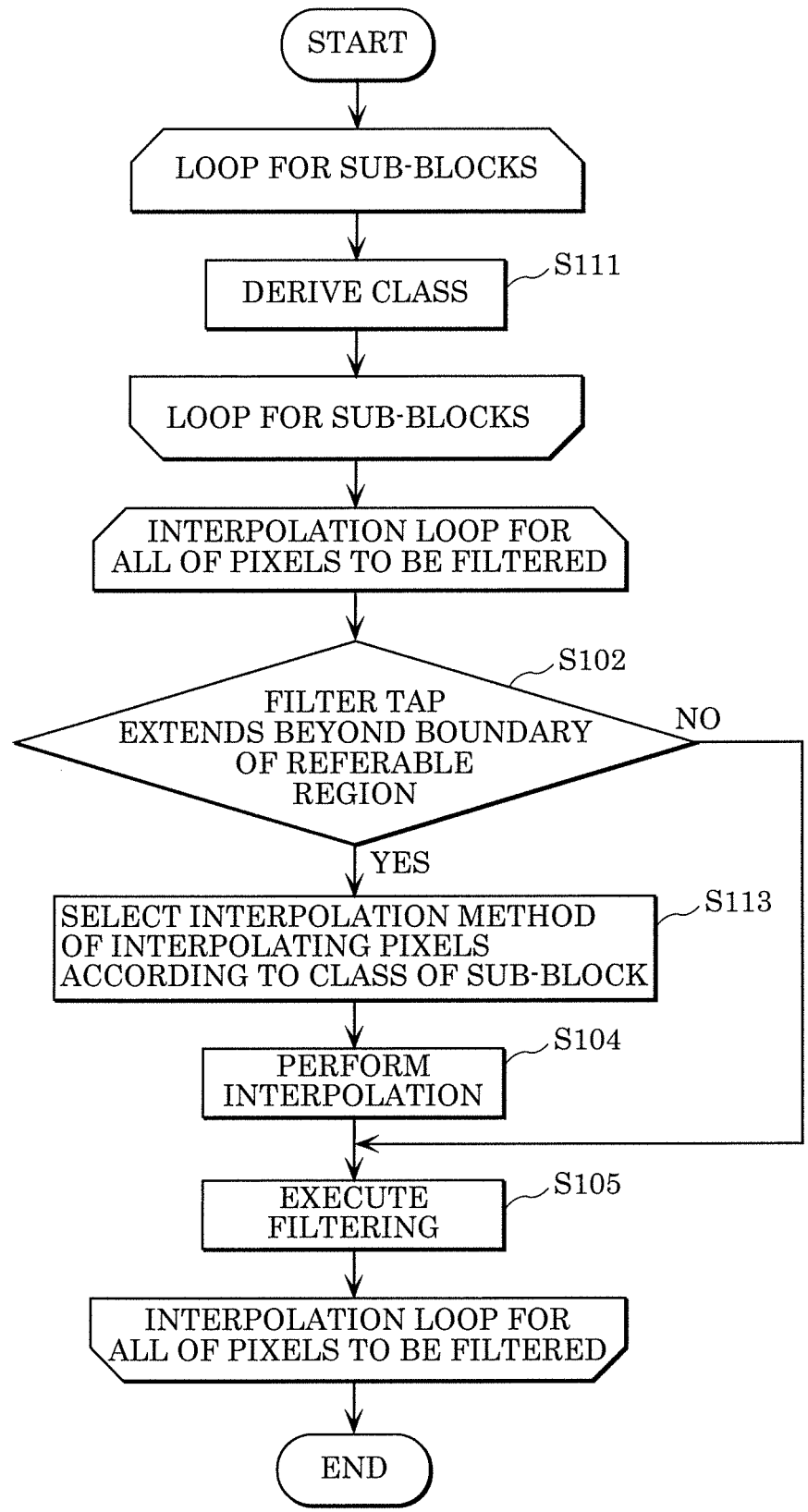
FIG. 19 illustrates another example of the filtering performed by the loop filter according to Embodiment 2.

FIG. 19 illustrates another example of the filtering performed by loop filter 120 according to the present embodiment.

First, loop filter 120 categorizes each of sub-blocks included in a current block into any one out of a plurality of classes (step S111). In other words, loop filter 120 categorizes each sub-block (for example, each 2×2 sub-block) into any one out of the plurality of classes (for example, 15 or 25 classes), as described in above-described Embodiment 1. The classification of the sub-block is based on gradient directionality and activity. For example, classification index C (for example, C=5D+A) is derived based on gradient directionality D (for example, 0 to 2, or 0 to 4) and gradient activity A (for example, 0 to 4). Loop filter 120 then categorizes the sub-block into a class associated with the derived classification index C. Through such classification, a class is derived for each of the sub-blocks.

Subsequently, loop filter 120 executes an interpolation loop for filtering all of pixels to be filtered. Specifically, in the interpolation loop, before filtering a current pixel, loop filter 120 determines whether a filter tap of the current pixel extends beyond the boundary of a referable region (step S102).

When determining that the filter tap extends beyond the boundary of the referable region (Yes in step S102), loop filter 120 selects, from among a plural types of interpolation methods, an interpolation method of interpolating pixels according to a class of a sub-block including the current pixel (step S113). In this way, an interpolation method of interpolating pixels according to a characteristic of a block, that is, a class of a sub-block is determined.

Subsequently, loop filter 120 performs interpolation using the selected interpolation method (step S104). Loop filter 120 then executes filtering on the current pixel using filter coefficients and pixels including the current pixel included in the filter tap. (step S105). In other words, loop filter 120 applies a filter such as an ALF or an SAO filter to the current pixel. In step S102, when determining that the filter tap does not extend beyond the boundary of the referable region (No in step S102), loop filter 120 executes filtering without carrying out the selection of an interpolation method and an interpolation process (step S105).

In the example illustrated in FIG. 19, in the determination of an interpolation method, loop filter 120 determines the interpolation method by selecting an interpolation method from among a plurality of interpolation methods based on a parameter indicating a characteristic of a block. The parameter here is a class categorized by gradient directionality and activity of an image in a block. More specifically, the parameter is classification index C.

Since a class, that is, classification index C, indicates also gradient directionality, loop filter 120, with the use of the class, is capable of determining an interpolation method of interpolating pixels according to gradient directionality as in the example illustrated in FIG. 11. Furthermore, since a class indicates not only gradient directionality but also gradient activity, loop filter 120 may determine the detail of an interpolation method. The detail of an interpolation method may be, for example, a type of an interpolation method, a range in which interpolation is performed, an order in which pixels are interpolated, and a direction along which interpolation is performed. In the selection of an interpolation method, an interpolation method associated with a characteristic of a sub-block including a current pixel may be selected from a plurality of combinations in each of which a characteristic (e.g., class) of a sub-block is associated with an interpolation method.

As described above, in encoder 100 according to the present embodiment, loop filter 120 determines, according to a characteristic of a block, an interpolation method for interpolating pixels located outside a referable region including the block, as illustrated in FIG. 11 through FIG. 19. Moreover, in decoder 200 according to the present embodiment, loop filter 212 determines, according to a characteristic of a block, an interpolation method for interpolating pixels located outside a referable region including the block, as does loop filter 120 in encoder 100. In each of encoder 100 and decoder 200, pixels are interpolated using the determined interpolation method and a filter is applied to the block using the interpolated pixels. It should be noted that in encoder 100, filter coefficients to be used for the filter are determined and added into an encoded bitstream. In decoder 200, the filter coefficients are extracted from the encoded bitstream and a filter is applied using the filter coefficients extracted.

With this, when pixels located outside a referable region are necessary for filter application to a block, the pixels are interpolated using one or more pixels in the referable region, therefore, there is no need to store, in a memory, actual pixels located outside the referable region in a reconstructed image. Accordingly memory capacity may be reduced. Moreover, since the pixels are interpolated using an interpolation method determined according to a characteristic of the block, it is possible to interpolate pixels having more appropriate pixel values compared to the case of interpolating pixels using a fixed interpolation method irrespective of a characteristic of a block. In other words, it is possible to approximate the pixel values of pixels obtained through the interpolation to the pixel values of actual pixels located outside the referable region in the reconstructed image. As a result, filtering accuracy can be enhanced.

Loop filter 120 or 212 may further determine, for each processing unit including a block, whether to interpolate pixels located outside a referable region using the determined interpolation method. The processing unit is, for example, a slice, a tile, a coding tree unit (CTU), or a frame.

With this, whether interpolation is to be performed is determined for each processing unit, and when it is determined that interpolation is to be performed, pixels located outside a referable region are interpolated using the determined interpolation method, and this can avoid the trouble of performing the interpolation even for a processing unit which does not need the interpolation. Accordingly, a processing load can be reduced.

Loop filter 120 or 212 may interpolate a pixel located outside a referable region by deriving at least one of a luma value or a chroma value of the pixel.

This makes it possible to derive, through interpolation, appropriate luma values or chroma values for pixels located outside a referable region.

A filter to be applied to a block may be at least one of an ALF or an SAO filter.

This makes it possible to enhance ALF and SAO filtering accuracy.

Note that in the present embodiment, a gradient of an image in a block, for instance, is used as a characteristic of a block, but a characteristic other than the gradient, e.g., an edge of an image, may be used.

Implementation Example

Figure 20A:
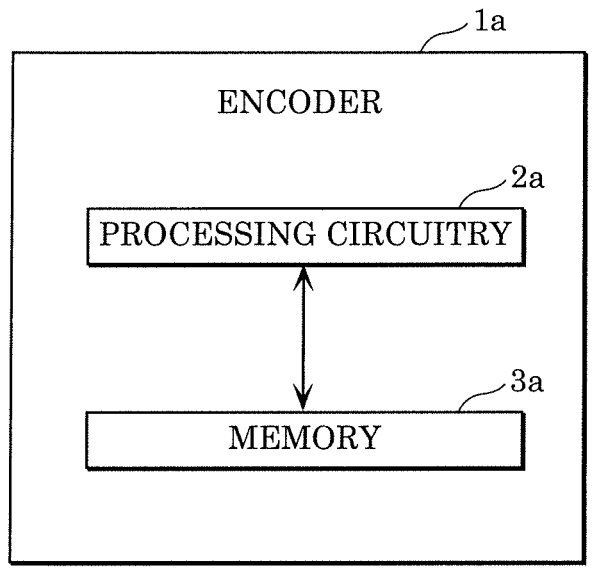
FIG. 20A is a block diagram illustrating an example of implementation of an encoder according to Embodiment 2.

FIG. 20A is a block diagram illustrating an example of implementation of an encoder according to Embodiment 2. Encoder 1a includes processing circuitry 2a and memory 3a. For example, the elements of encoder 100 illustrated in FIG. 1 are implemented by processing circuitry 2a and memory 3a illustrated in FIG. 20A.

Processing circuitry 2a processes information and is accessible to memory 3a. For example, processing circuitry 2a is a dedicated or general-purpose electronic circuit which encodes videos. Processing circuitry 2a may be a processor such as a central processing unit (CPU). Processing circuitry 2a may be an aggregate of a plurality of electronic circuits. For example, processing circuitry 2a may serve as elements among the elements of encoder 100 illustrated in FIG. 1 other than the elements for storing information.

Memory 3a is a dedicated or general-purpose memory that stores information for processing circuitry 2a to encode videos, Memory 3a may be an electronic circuit and connected to processing circuitry 2a. Memory 3a may be included in processing circuitry 2a. Processing circuitry 3a may be an aggregate of a plurality of electronic circuits. Memory 3a may be a magnetic disk or an optical disc, and may be expressed as storage or recording medium. Memory 3a may be nonvolatile memory or volatile memory.

For example, memory 3a may store a video to be encoded or a bit string corresponding to an encoded video. Memory 3a may store a program for processing circuitry 2a to encode videos.

For example, processing circuitry 3a may serve as the elements for storing information, among the elements of encoder 100 illustrated in FIG. 1. Specifically, memory 3a may serve as block memory 118 and frame memory 122 illustrated in FIG. 1. More specifically, memory 3a may store processed sub-blocks, processed blocks, and processed pictures, for instance.

Note that encoder 100 may not include all the elements illustrated in FIG. 1, and may not perform all the processes described above. One or more of the elements illustrated in FIG. 1 may be included in another device, or one or more of the processes described above may be performed by another device.

Figure 20B:
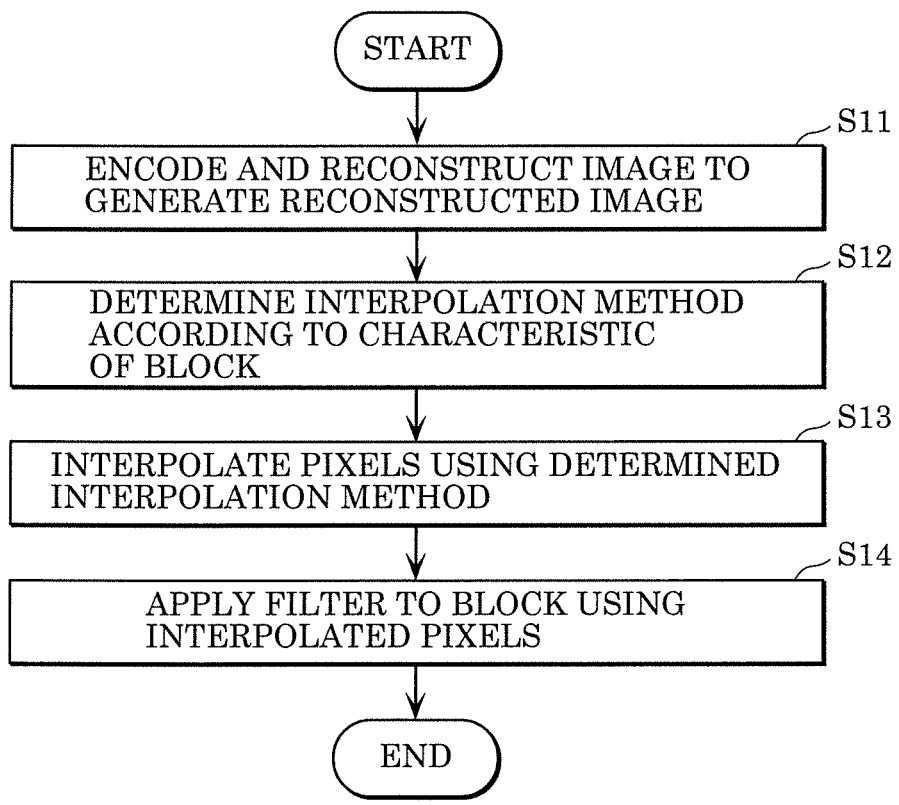
FIG. 20B is a flowchart illustrating an example of a processing operation performed by the encoder including processing circuitry and memory according to Embodiment 2.

FIG. 20B is a flowchart illustrating a processing operation performed by encoder 1a including processing circuitry 2a and memory 3a.

Using memory 3a, processing circuitry 2a first encodes and reconstructs an image to generate a reconstructed image (step S11). Subsequently, processing circuitry 2a determines, according to a characteristic of a block in the reconstructed image, an interpolation method for interpolating pixels located outside a referable region including the block (step S12). After that, processing circuitry 2a interpolates the pixels located outside the referable region using the determined interpolation method (step S13). Processing circuitry 2a then applies a filter to the block using the interpolated pixels (step S14).

With this, when pixels located outside a referable region are necessary for filter application to a block, the pixels are interpolated using one or more pixels in the referable region, therefore, there is no need to store, in a memory, actual pixels located outside the referable region in a reconstructed image. Accordingly, memory capacity may be reduced. Moreover, since the pixels are interpolated using an interpolation method determined according to a characteristic of the block, it is possible to interpolate pixels having more appropriate pixel values compared to the case of interpolating pixels using a fixed interpolation method irrespective of a characteristic of a block. In other words, it is possible to approximate the pixel values of pixels obtained through the interpolation to the pixel values of actual pixels located outside the referable region in the reconstructed image. As a result, filtering accuracy can be enhanced.

Figure 20C:
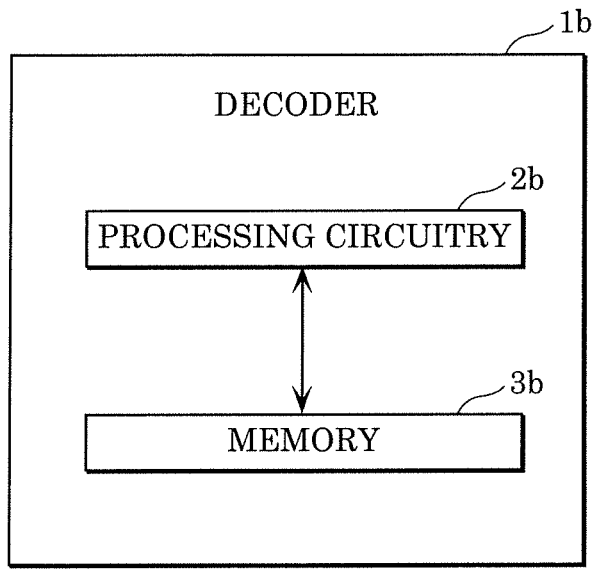
FIG. 20C is a block diagram illustrating an example of implementation of a decoder according to Embodiment 2.

FIG. 20C is a block diagram illustrating an example of implementation of a decoder according to Embodiment 2. Decoder 1b includes processing circuit 2b and memory 3b. For example, the elements of decoder 200 illustrated in FIG. 10 are implemented by processing circuitry 2b and memory 3b illustrated in FIG. 20C.

Processing circuitry 2b processes information and is accessible to memory 3b. For example, processing circuitry 2b is a dedicated or general-purpose electronic circuit which decodes videos. Processing circuitry 2b may be a processor such as a central processing unit (CPU). Processing circuitry 2b may be an aggregate of a plurality of electronic circuits. For example, processing circuitry 2b may serve as elements among the elements of decoder 200 illustrated in FIG. 10 other than the elements for storing information.

Memory 3b is a dedicated or general-purpose memory that stores information for processing circuitry 2b to decode videos, Memory 3b may be an electronic circuit and connected to processing circuitry 2b. Memory 3b may be included in processing circuitry 2b. Processing circuitry 3b may be an aggregate of a plurality of electronic circuits. Memory 3b may be a magnetic disk or an optical disc, and may be expressed as storage or recording medium. Memory 3b may be nonvolatile memory or volatile memory.

Memory 3b may store a bit string corresponding to an encoded video or a video corresponding to a decoded bit string. Memory 3b may store a program for circuitry 2b to decode videos.

For example, processing circuitry 3b may serve the elements for storing information among the elements of decoder 200 illustrated in FIG. 10. Specifically, memory 3b may serve as block memory 210 and frame memory 214 illustrated in FIG. 10. More specifically, memory 3b may store processed sub-blocks, processed blocks, and processed pictures, for instance.

Note that decoder 200 may not include all the elements illustrated in FIG. 10, and may not perform all the processes described above. One or more of the elements illustrated in FIG. 10 may be included in another device, or one or more of the processes described above may be performed by another device.

Figure 20D:
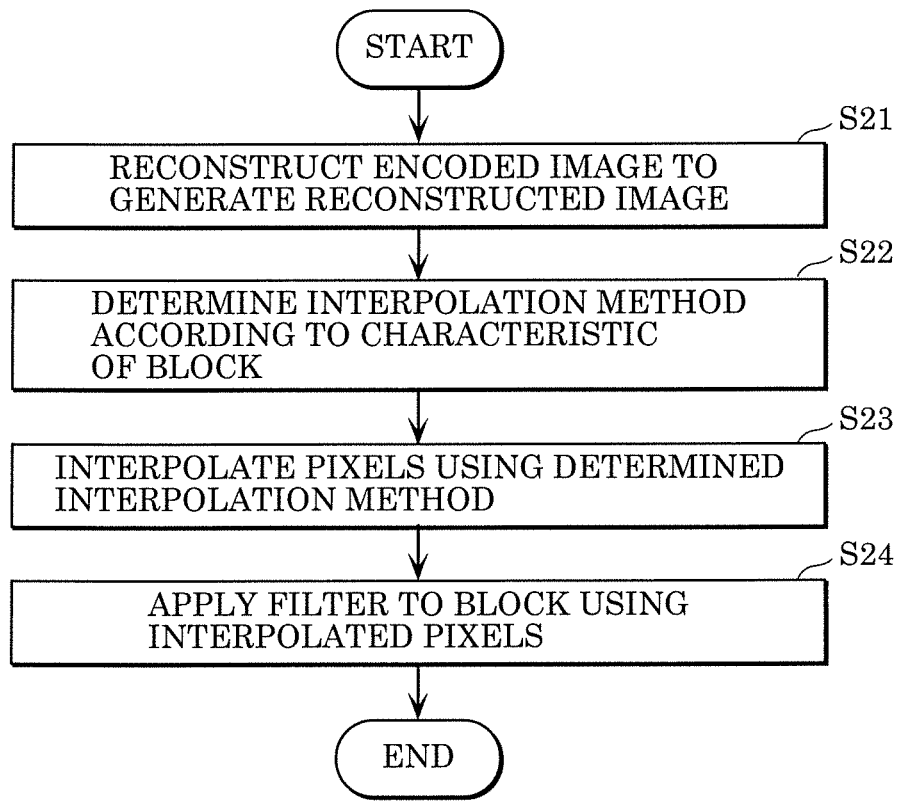
FIG. 20D is a flowchart illustrating an example of a processing operation performed by the decoder including processing circuitry and memory according to Embodiment 2.

FIG. 20D is a flowchart illustrating a processing operation performed by decoder 1b including processing circuit 2b and memory 3b.

Using memory 3b, processing circuitry 2b first encodes and reconstructs an image to generate a reconstructed image (step S21). Subsequently, processing circuitry 2b determines, according to a characteristic of a block in the reconstructed image, an interpolation method for interpolating pixels located outside a referable region including the block (step S22). After that, processing circuitry 2b interpolates the pixels located outside the referable region using the determined interpolation method (step S22). Processing circuitry 2b then applies a filter to the block using the interpolated pixels (step S23).

With this, when pixels located outside a referable region are necessary for filter application to a block, the pixels are interpolated using one or more pixels in the referable region, therefore, there is no need to store, in a memory, actual pixels located outside the referable region in a reconstructed image. Accordingly, memory capacity may be reduced. Moreover, since the pixels are interpolated using an interpolation method determined according to a characteristic of the block, it is possible to interpolate pixels having more appropriate pixel values compared to the case of interpolating pixels using a fixed interpolation method irrespective of a characteristic of a block. In other words, it is possible to approximate the pixel values of pixels obtained through the interpolation to the pixel values of actual pixels located outside the referable region in the reconstructed image. As a result, filtering accuracy can be enhanced.

[Supplemental Information]

Encoder 100 and decoder 200 according to the present embodiment may be used as an image encoder and an image decoder, respectively or may be used as a video encoder and a video decoder, respectively.

In the present embodiment, each of the elements may be configured of dedicated hardware or may be implemented by executing a software program suitable for the element. Each of the elements may be implemented by a program executor such as a CPU or a processor reading and executing a software program recorded on a recording medium such as a hard disc or a semiconductor memory.

Specifically, encoder 100 and decoder 200 may each include processing circuitry, and storage electrically coupled to the processing circuitry and accessible from the processing circuitry.

The processing circuitry includes at least one of the dedicated hardware and the program executor, and performs processing using the storage. If the processing circuitry includes a program executor, the storage stores a software program to be executed by the program executor.

Here, the software which implements encoder 100 or decoder 200 according to each of the aforementioned embodiments, for instance, is a program as follows.

Namely the program causes a computer to execute the processing according to the flowchart shown in any one of FIG. 5B, FIG. 5D, FIG. 11, FIG. 14, FIG. 19, FIG. 20B, and FIG. 20D.

The elements may be circuits as described above. These circuits may constitute one circuitry as a whole, or may be separate circuits. Each element may be implemented by a general-purpose processor or by a dedicated processor.

Processing performed by a specific element may be performed by a different element. The order of performing processes may be changed or the processes may be performed in parallel. An encoder/decoder may include encoder 100 and decoder 200.

The ordinal numbers such as first and second used in the description may be each replaced with a different ordinal number where necessary. A new ordinal number may be provided for or any of the existing ordinal numbers may be removed from the elements.

The above has given a description of aspects of encoder 100 and decoder 200 based on the embodiments, yet the aspects of encoder 100 and decoder 200 are not limited to the embodiments. The aspects of encoder 100 and decoder 200 may also encompass various modifications that may be conceived by those skilled in the art to the embodiments, and embodiments achieved by combining elements in different embodiments, without departing from the scope of the present disclosure.

[Combination with Other Aspects]

This aspect may be implemented in combination with one or more of the other aspects according to the present disclosure. In addition, one or more of the processes in the flowcharts, one or more of the constituent elements of the apparatuses, and part of the syntax described in this aspect may be implemented in combination with other aspects.

Embodiment 3

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

Usage Examples

Figure 21:
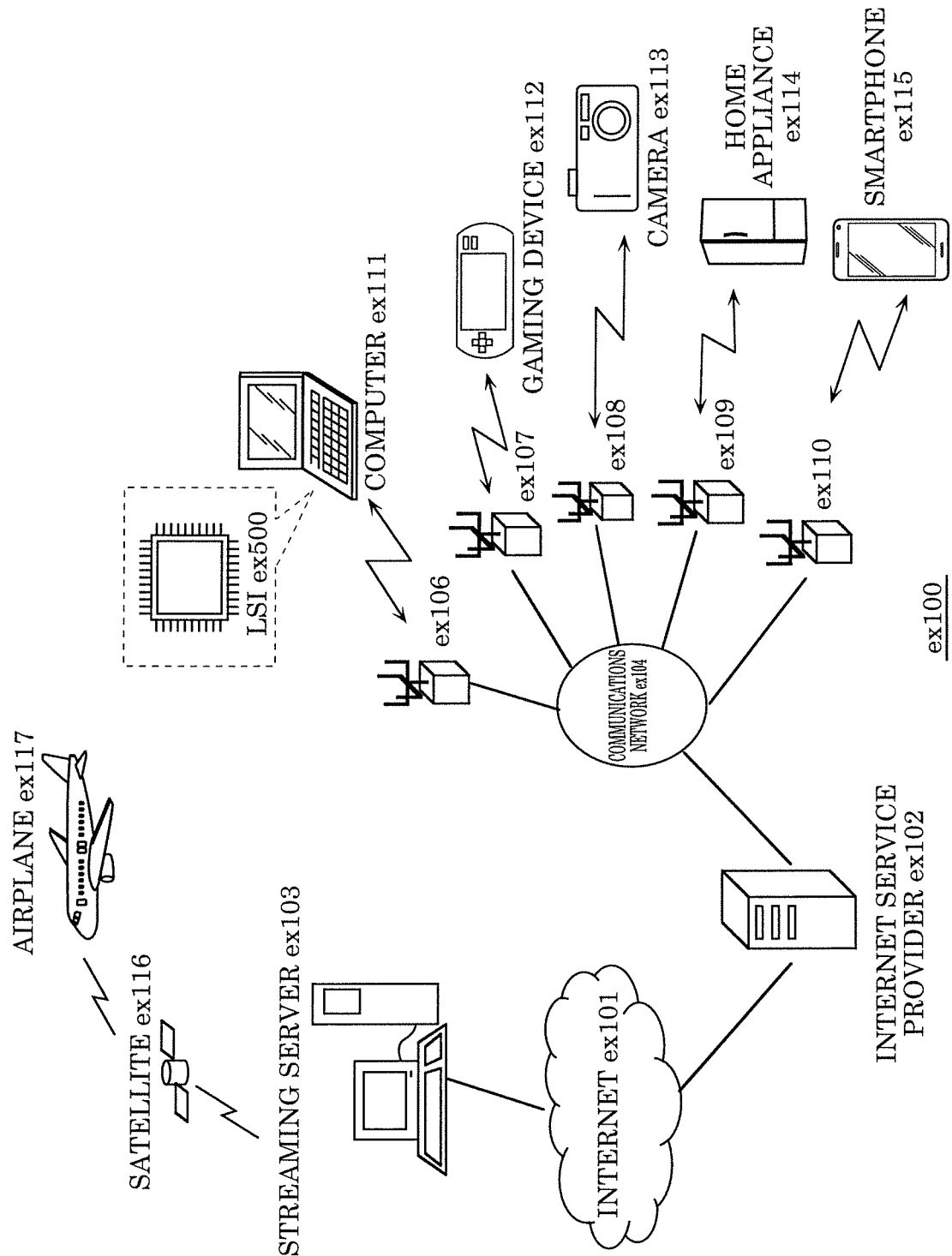
FIG. 21 illustrates an overall configuration of a content providing system for implementing a content distribution service.

FIG. 21 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 22:
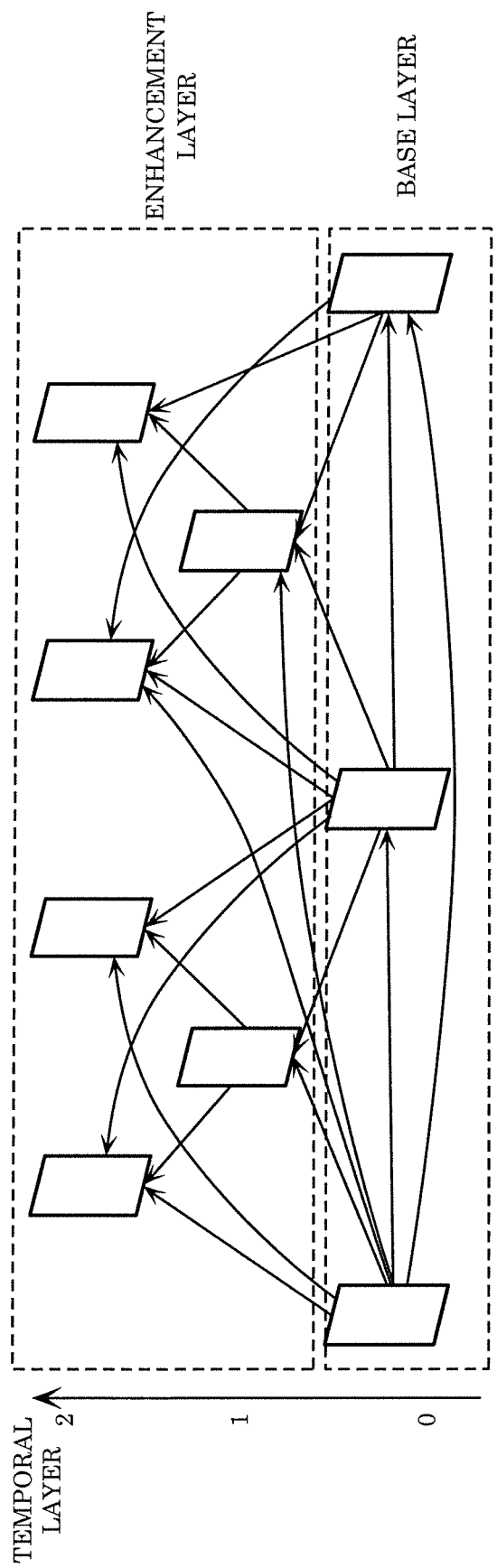
FIG. 22 illustrates one example of an encoding structure in scalable encoding.

The switching of content will be described with reference to a scalable stream, illustrated in FIG. 22, which is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 18. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 23:
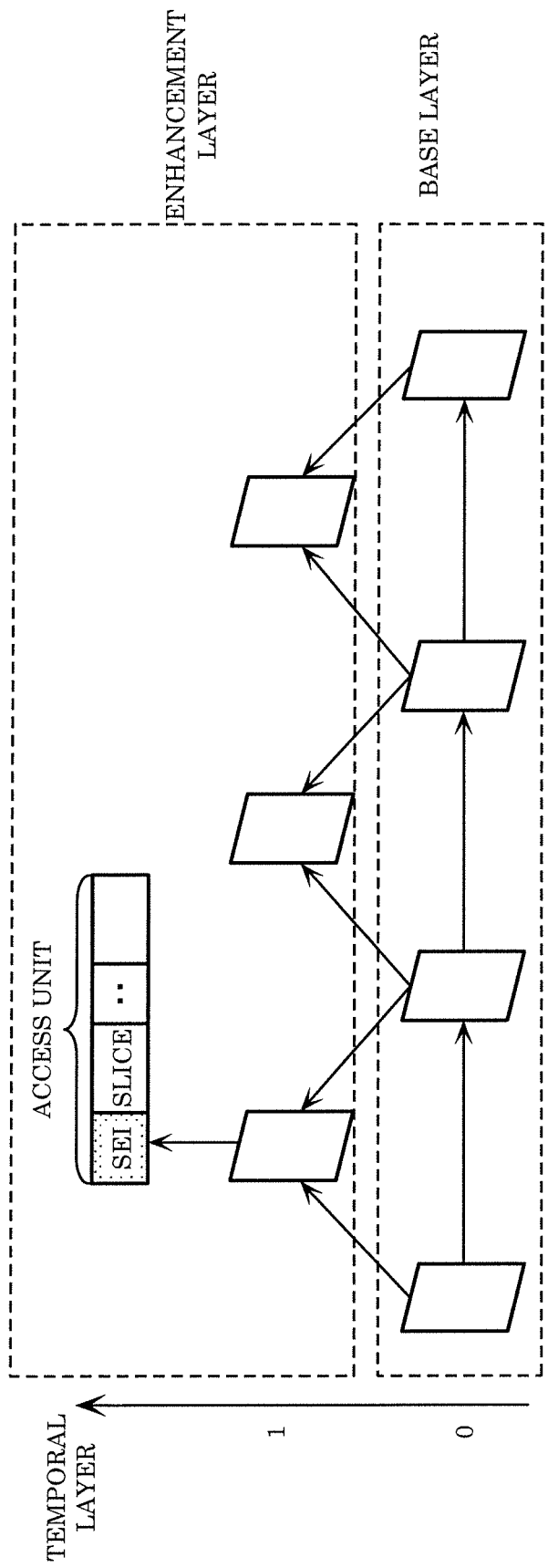
FIG. 23 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 23, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 24:
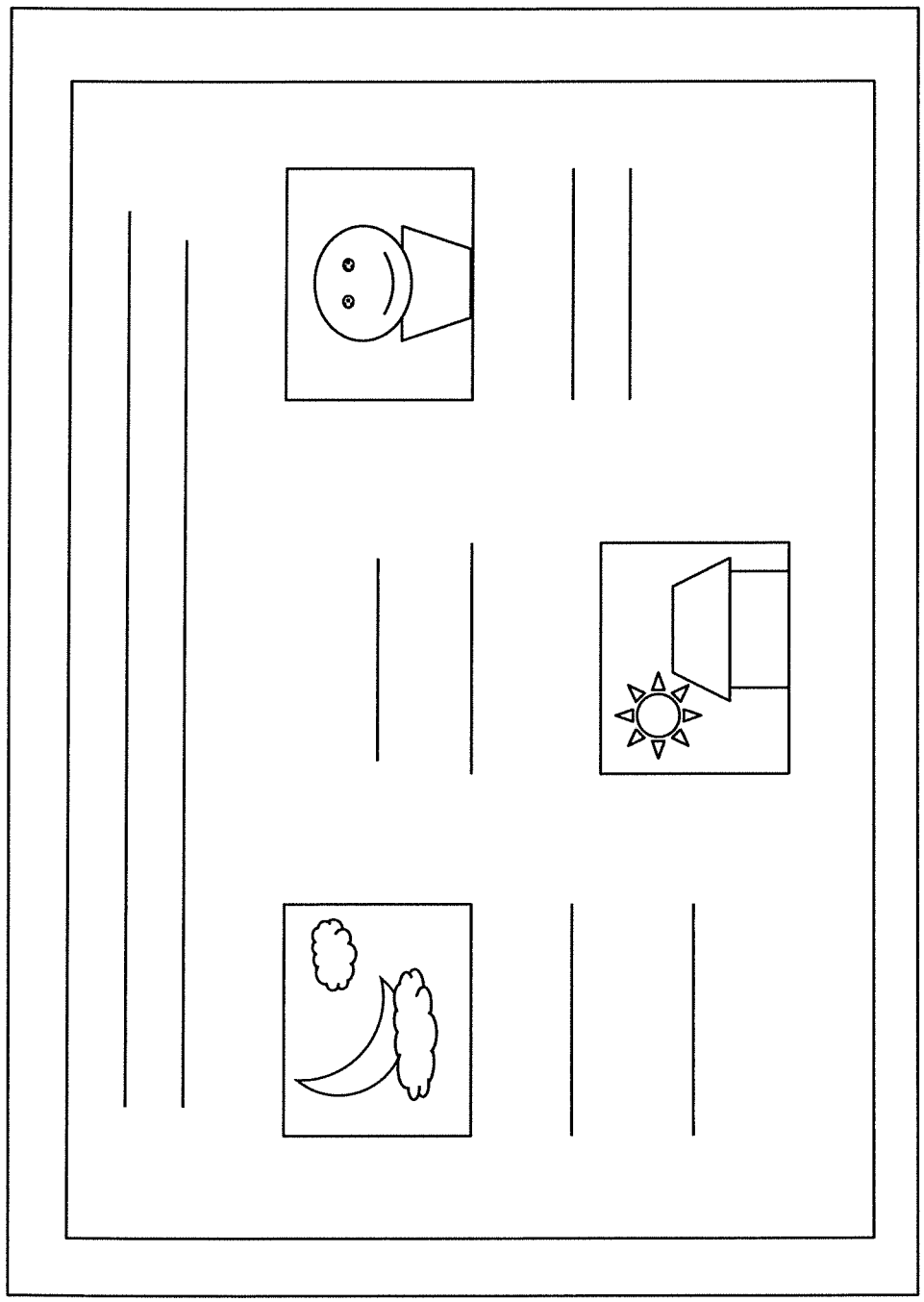
FIG. 24 illustrates an example of a display screen of a web page.
Figure 25:
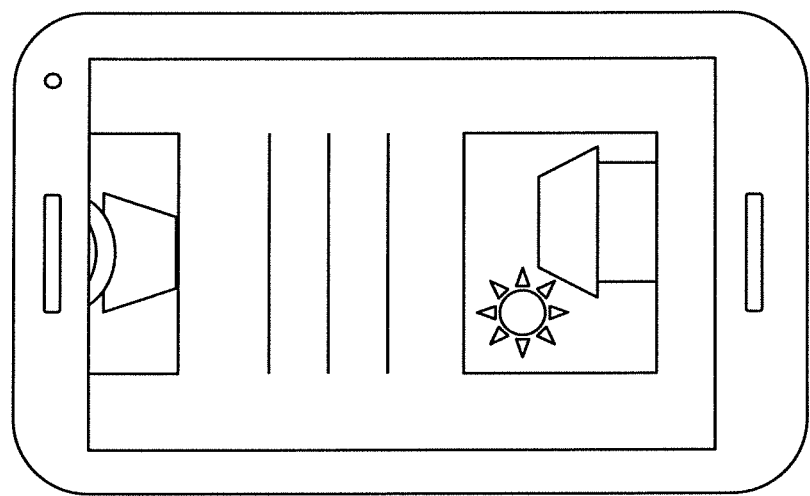
FIG. 25 illustrates an example of a display screen of a web page.

FIG. 24 illustrates an example of a display screen of a web page on, for example, computer ex111. FIG. 25 illustrates an example of a display screen of a web page on, for example, smartphone ex115. As illustrated in FIG. 24 and FIG. 25, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server-either when prompted or automatically-edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person.

Alternatively as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 26:
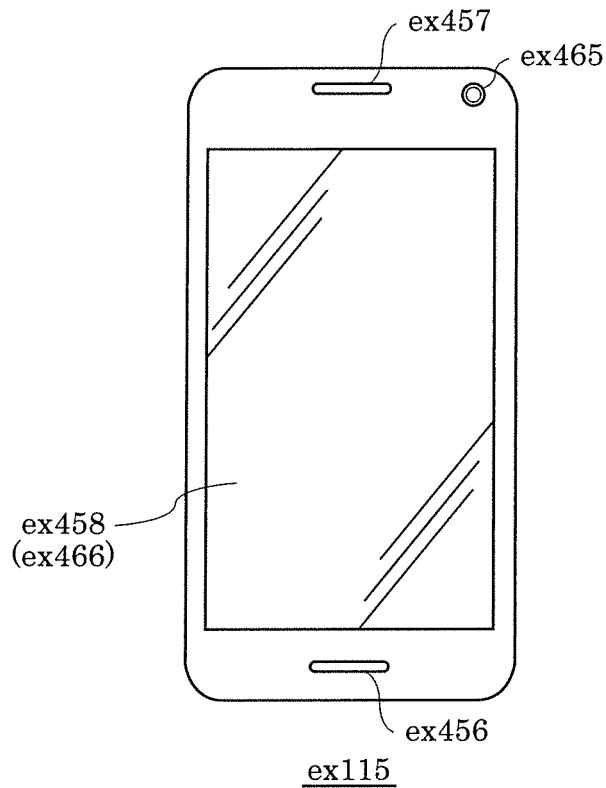
FIG. 26 illustrates one example of a smartphone.
Figure 27:
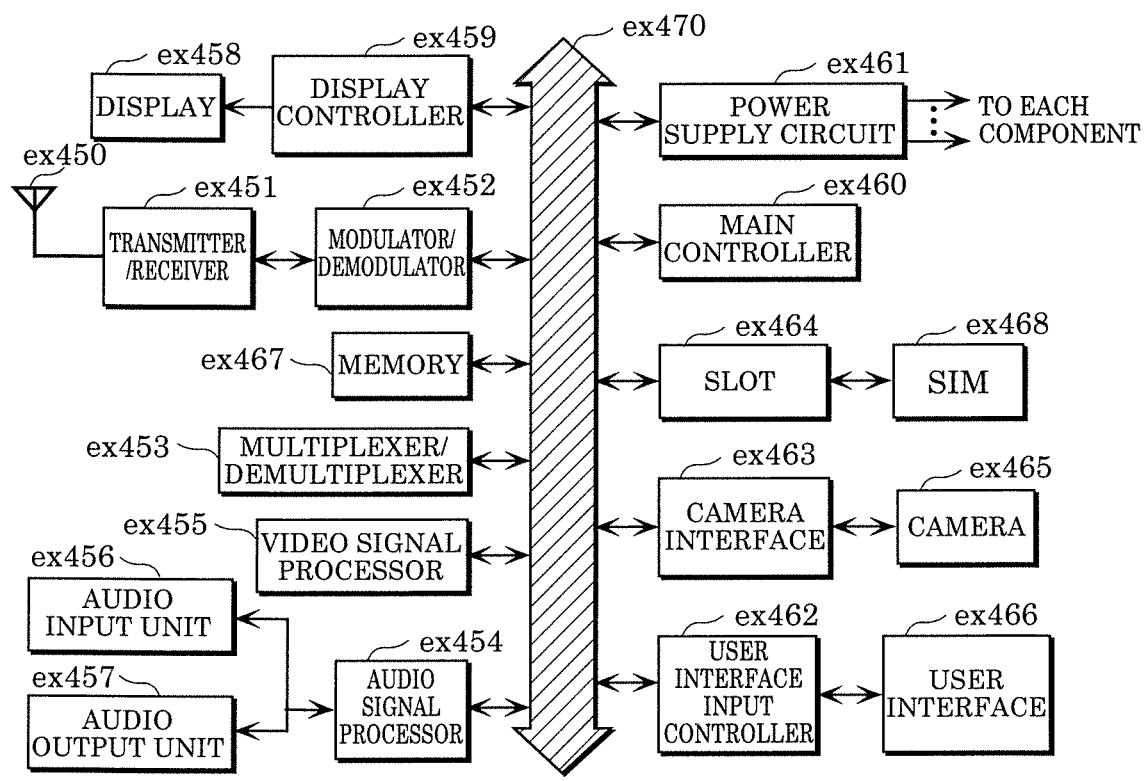
FIG. 27 is a block diagram illustrating a configuration example of a smartphone.

FIG. 26 illustrates smartphone ex115. FIG. 27 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470.

Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

INDUSTRIAL APPLICABILITY

The encoder and the decoder according to the present disclosure produce advantageous effects of enabling further improvement, and are applicable to information display devices or imaging devices such as TVs, digital video recorders, car navigations, cell phones, digital cameras, digital camcorders, in-vehicle cameras, or network cameras.

What is claimed is:

1. An encoder, comprising:
processing circuitry; and
memory, wherein using the memory, the processing circuitry:
encodes and reconstructs an image to generate a reconstructed image;
determines a gradient directionality of a current block in the reconstructed image;
interpolates a pixel located outside a referable region including the current block, the interpolated pixel being located outside of the referable region so as to be aligned along a predetermined direction with one or more pixels of the current block, the predetermined direction being the determined gradient directionality of the current block or a direction vertical to the determined gradient directionality of the current block; and
applies a filter to the current block using the interpolated pixel,
wherein the processing circuitry determines the gradient directionality of the current block by (i) for each of a plurality of sub-blocks of the current block, deriving a local gradient of an image included in the sub-block and (ii) comparing directions of the local gradients derived for the plurality of sub-blocks of the current block, and
wherein the processing circuitry (i) determines a gradient activity of the current block using the directions of the local gradients derived for the plurality of sub-blocks of the current block, and (ii) selects an interpolation method for interpolating the pixel located outside the referable region from among a plurality of interpolation methods using the determined gradient directionality of the current block and the determined gradient activity of the current block.

2. The encoder according to claim 1, wherein
the processing circuitry determines the interpolation method according to a class categorized using the determined gradient directionality of the current block.

3. The encoder according to claim 1, wherein
the processing circuitry interpolates another pixel located outside the referable region, the interpolated other pixel being located outside of the referable region so as to be aligned (i) along the direction vertical to the determined gradient directionality of the current block, when the interpolated pixel located outside the referable region is aligned along the determined gradient directionality of the current block and (ii) along the determined gradient directionality of the current block, when the interpolated pixel located outside the referable region is aligned along the direction vertical to the determined gradient directionality of the current block.

4. The encoder according to claim 1, wherein
the pixel located outside the referable region is interpolated using at least one of a padding process or a mirroring process,
the padding process is a process of copying a copy source pixel that is located in the referable region and is adjacent to a boundary of the referable region, to interpolate at least one pixel that is placed outside the referable region and aligned with the copy source pixel along the predetermined direction and that has a pixel value equal to a pixel value of the copy source pixel, and
the mirroring process is a process of copying N copy source pixels placed along the predetermined direction in the referable region, to interpolate N pixels that are placed outside the referable region, aligned with the N copy source pixels along the predetermined direction, and symmetric to the N copy source pixels with respect to the boundary, each of the N pixels having a pixel value equal to a pixel value of a corresponding one of the N copy source pixels, where N is an integer greater than or equal to 1.

5. The encoder according to claim 1, wherein
the processing circuitry further determines, for each processing unit including the current block, whether to interpolate the pixel located outside the referable region, and the processing unit is a slice, a tile, a coding tree unit (CTU), or a frame.

6. The encoder according to claim 1, wherein the processing circuitry interpolates the pixel located outside the referable region by deriving at least one of a luma value or a chroma value of the pixel.

7. The encoder according to claim 1, wherein the filter to be applied to the current block is at least one of an adaptive loop filter (ALF) or a sample adaptive offset (SAO) filter.

8. A decoder, comprising:
processing circuitry; and
memory, wherein
using the memory, the processing circuitry:
  reconstructs an encoded image to generate a reconstructed image;
  determines a gradient directionality of a current block in the reconstructed image;
  interpolates a pixel located outside a referable region including the current block, the interpolated pixel being located outside of the referable region so as to be aligned along a predetermined direction with one or more pixels of the current block, the predetermined direction being the determined gradient directionality of the current block or a direction vertical to the determined gradient directionality of the current block; and
  applies a filter to the current block using the interpolated pixel,
  wherein the processing circuitry determines the gradient directionality of the current block by (i) for each of a plurality of sub-blocks of the current block, deriving a local gradient of an image included in the sub-block and (ii) comparing directions of the local gradients derived for the plurality of sub-blocks of the current block, and
  wherein the processing circuitry (i) determines a gradient activity of the current block using the directions of the local gradients derived for the plurality of sub-blocks of the current block, and (ii) selects an interpolation method for interpolating the pixel located outside the referable region from among a plurality of interpolation methods using the determined gradient directionality of the current block and the determined gradient activity of the current block.

9. The decoder according to claim 8, wherein the processing circuitry determines the interpolation method according to a class categorized using the determined gradient directionality of the current block.

10. The decoder according to claim 8, wherein the processing circuitry interpolates another pixel located outside the referable region, the interpolated other pixel being located outside of the referable region so as to be aligned (i) along the direction vertical to the determined gradient directionality of the current block, when the interpolated pixel located outside the referable region is aligned along the determined gradient directionality of the current block and (ii) along the determined gradient directionality of the current block, when the interpolated pixel located outside the referable region is aligned along the direction vertical to the determined gradient directionality of the current block.

11. The decoder according to claim 8, wherein the pixel located outside the referable region is interpolated using at least one of a padding process or a mirroring process, the padding process is a process of copying a copy source pixel that is located in the referable region and is adjacent to a boundary of the referable region, to interpolate at least one pixel that is placed outside the referable region and aligned with the copy source pixel along the predetermined direction and that has a pixel value equal to a pixel value of the copy source pixel, the mirroring process is a process of copying N copy source pixels placed along the predetermined direction in the referable region, to interpolate N pixels that are placed outside the referable region, aligned with the N copy source pixels along the predetermined direction, and symmetric to the N copy source pixels with respect to the boundary, each of the N pixels having a pixel value equal to a pixel value of a corresponding one of the N copy source pixels, where N is an integer greater than or equal to 1.

12. The decoder according to claim 8, wherein the processing circuitry further determines, for each processing unit including the current block, whether to interpolate the pixel located outside the referable region, and
the processing unit is a slice, a tile, a coding tree unit (CTU), or a frame.

13. The decoder according to claim 8, wherein the processing circuitry interpolates the pixel located outside the referable region by deriving at least one of a luma value or a chroma value of the pixel.

14. The decoder according to claim 8, wherein the filter to be applied to the current block is at least one of an adaptive loop filter (ALF) or a sample adaptive offset (SAO) filter.

15. An encoding method, comprising:
encoding and reconstructing an image to generate a reconstructed image;
determining a gradient directionality of a current block in the reconstructed image;
interpolating a pixel located outside a referable region including the current block, the interpolated pixel being located outside of the referable region so as to be aligned along a predetermined direction with one or more pixels of the current block, the predetermined direction being the determined gradient directionality of the current block or a direction vertical to the determined gradient directionality of the current block; and
applying a filter to the current block using the interpolated pixel,
wherein the gradient directionality of the current block is determined by (i) for each of a plurality of sub-blocks of the current block, deriving a local gradient of an image included in the sub-block and (ii) comparing directions of the local gradients derived for the plurality of sub-blocks of the current block, and
wherein the encoding method further comprises:
determining a gradient activity of the current block using the directions of the local gradients derived for the plurality of sub-blocks of the current block; and
selecting an interpolation method for interpolating the pixel located outside the referable region from among a plurality of interpolation methods using the determined gradient directionality of the current block and the determined gradient activity of the current block.

16. A decoding method, comprising:
reconstructing an encoded image to generate a reconstructed image;

determining a gradient directionality of a current block in the reconstructed image;

interpolating a pixel located outside a referable region including the current block, the interpolated pixel being located outside of the referable region so as to be aligned along a predetermined direction with one or more pixels of the current block, the predetermined direction being the determined gradient directionality of the current block or a direction vertical to the determined gradient directionality of the current block; and applying a filter to the current block using the interpolated pixel, wherein the gradient directionality of the current block is determined by (i) for each of a plurality of sub-blocks of the current block, deriving a local gradient of an image included in the sub-block and (ii) comparing directions of the local gradients derived for the plurality of sub-blocks of the current block, and wherein the decoding method further comprises:

determining a gradient activity of the current block using the directions of the local gradients derived for the plurality of sub-blocks of the current block; and selecting an interpolation method for interpolating the pixel located outside the referable region from among a plurality of interpolation methods using the determined gradient directionality of the current block and the determined gradient activity of the current block.

* * * * *